United States Patent [19]

Arase et al.

[11] 4,193,119
[45] Mar. 11, 1980

[54] APPARATUS FOR ASSISTING IN THE TRANSPOSITION OF FOREIGN LANGUAGE TEXT

[75] Inventors: Shingo Arase, Monterey Park, Calif.; Roy J. Lahr, Fairfield, Conn.

[73] Assignee: Xerox Corporation, Stamford, Conn.

[21] Appl. No.: 781,266

[22] Filed: Mar. 25, 1977

[51] Int. Cl.² .......................................... G06F 15/38
[52] U.S. Cl. .................................. 364/900; 340/712; 340/751; 340/790; 340/798; 340/707; 340/365 R; 340/146.3 AH
[58] Field of Search ...... 340/324 A, 324 AD, 324 M, 340/712, 751, 745, 790, 798, 707, 305 R; 364/200 MS File, 900, 200; 178/30

[56] References Cited

U.S. PATENT DOCUMENTS

| | | | |
|---|---|---|---|
| 3,325,786 | 6/1967 | Shashoua et al. | 364/900 |
| 3,389,404 | 6/1968 | Koster | 364/200 |
| 3,422,419 | 1/1969 | Mathews et al. | 340/324 |
| 3,654,611 | 4/1972 | Bluethman et al. | 364/200 |
| 3,665,450 | 5/1972 | Leban | 340/324 A |
| 3,725,900 | 4/1973 | Ohmann et al. | 340/324 A |
| 3,754,459 | 8/1973 | Coleman et al. | 197/1 |
| 3,815,104 | 6/1974 | Goldman | 364/200 |
| 3,820,644 | 6/1974 | Yeh | 197/1 A |
| 3,848,232 | 11/1974 | Leibler et al. | 364/200 |
| 3,921,148 | 11/1975 | Ophir et al. | 364/200 |
| 3,936,664 | 2/1976 | Sato | 340/324 AD |
| 3,964,591 | 6/1976 | Hill et al. | 197/1 R |
| 3,996,584 | 12/1976 | Plager | 340/324 AD |
| 4,017,680 | 4/1977 | Anderson et al. | 340/324 A |
| 4,041,482 | 8/1977 | Freudeberg et al. | 340/324 AD |
| 4,122,533 | 10/1978 | Kubinak | 340/790 |
| 4,124,843 | 11/1978 | Bramson et al. | 340/711 |

OTHER PUBLICATIONS

F. F. Fang et al., "Character Selection System for Chinese Character Keyboard", IBM Technical Disclosure, vol. 13, No. 11, (Apr. 1971).
R. Suding, "Complex Symbol Printing System", IBM Technical Disclosure, vol. 19, No. 3, (Aug. 1976).
Dunham et al., "Chinese Typewriter System" IBM Technical Disclosure, vol. 19, No. 1, (Jun. 1976).
Digital Design "Bilingual CRT Terminal Sports Japanese Characters", Jan. 1978.

*Primary Examiner*—Gareth D. Shaw
*Assistant Examiner*—E. Chan
*Attorney, Agent, or Firm*—Barry Paul Smith

[57] ABSTRACT

A device is provided for printing a verbal composition in a text form transposed by an operator from the language form in which the source material is presented. Language character forms from different written language formats are encoded and maintained in electronic storage. An operator of the device selects a particular language character from a desired language character font in a single or multiple step selection process to appear at sequential locations of the text during composition of the text. The material to be transposed may be originally presented orally or visually, and is translated or transposed into a different language, or, in the case of some languages, particularly oriental languages, the text may be composed of different language character forms of the same spoken language. For language character forms that utilize a great multiplicity of characters, as opposed to language forms utilizing a relatively few alphabetic or pneumonic characters, a second order selection is made. In this utilization a character or character combination from the simpler language is first selected. All characters of the more complex language form corresponding to the simple character selected are then displayed. The operator then selects from the among the complex characters for inclusion in the text.

21 Claims, 41 Drawing Figures

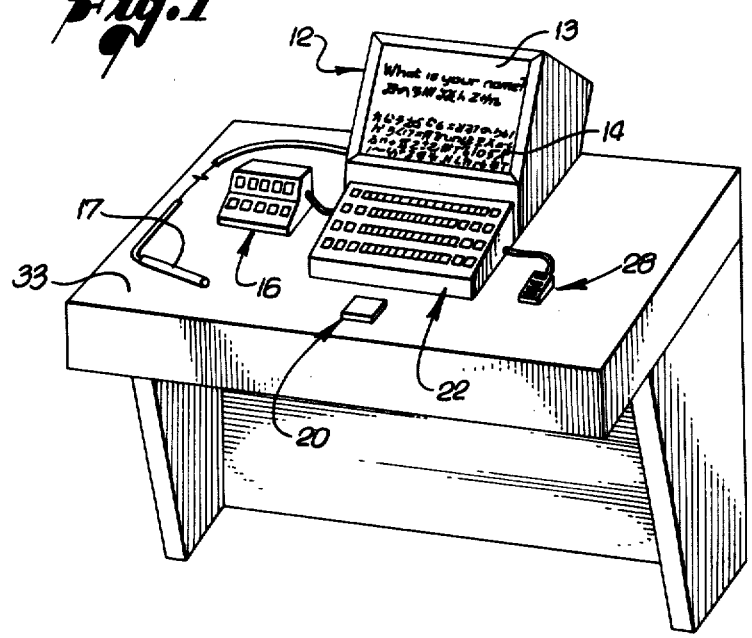
fig.1
fig.1a
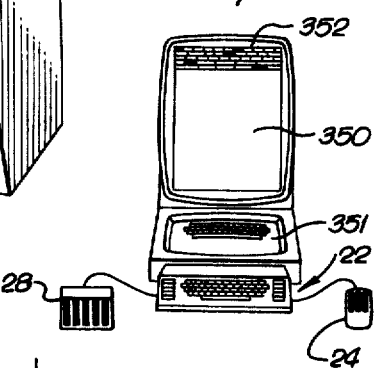
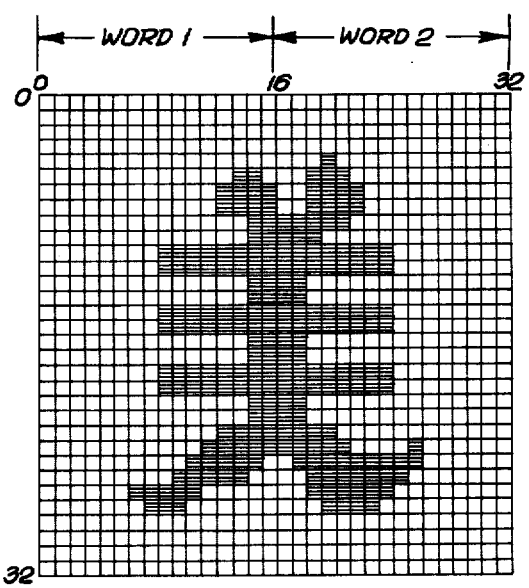
fig.2
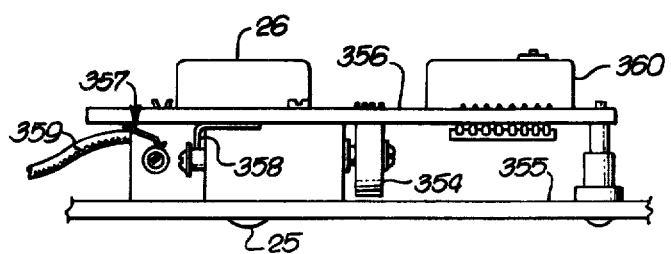
fig.4

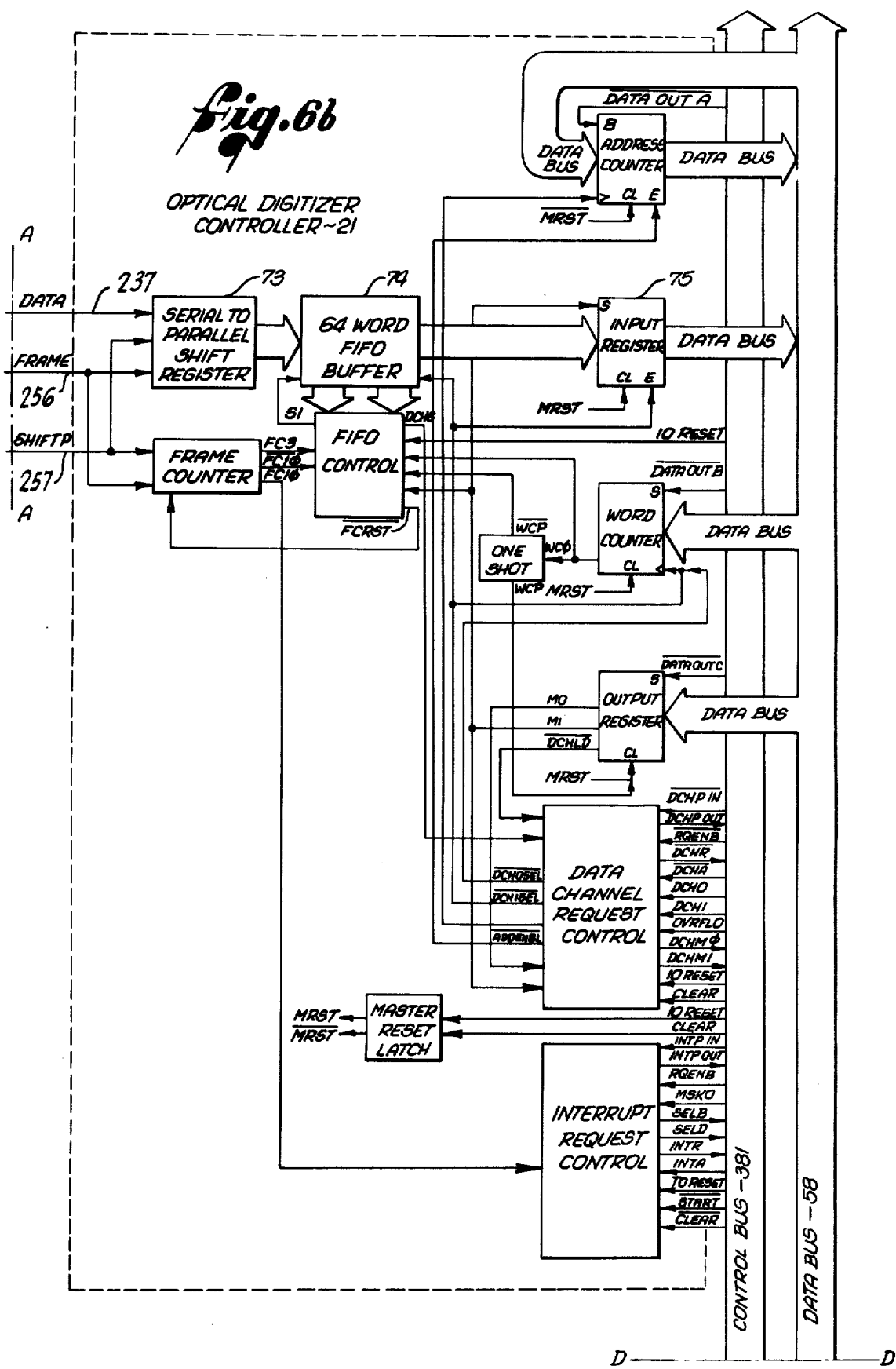

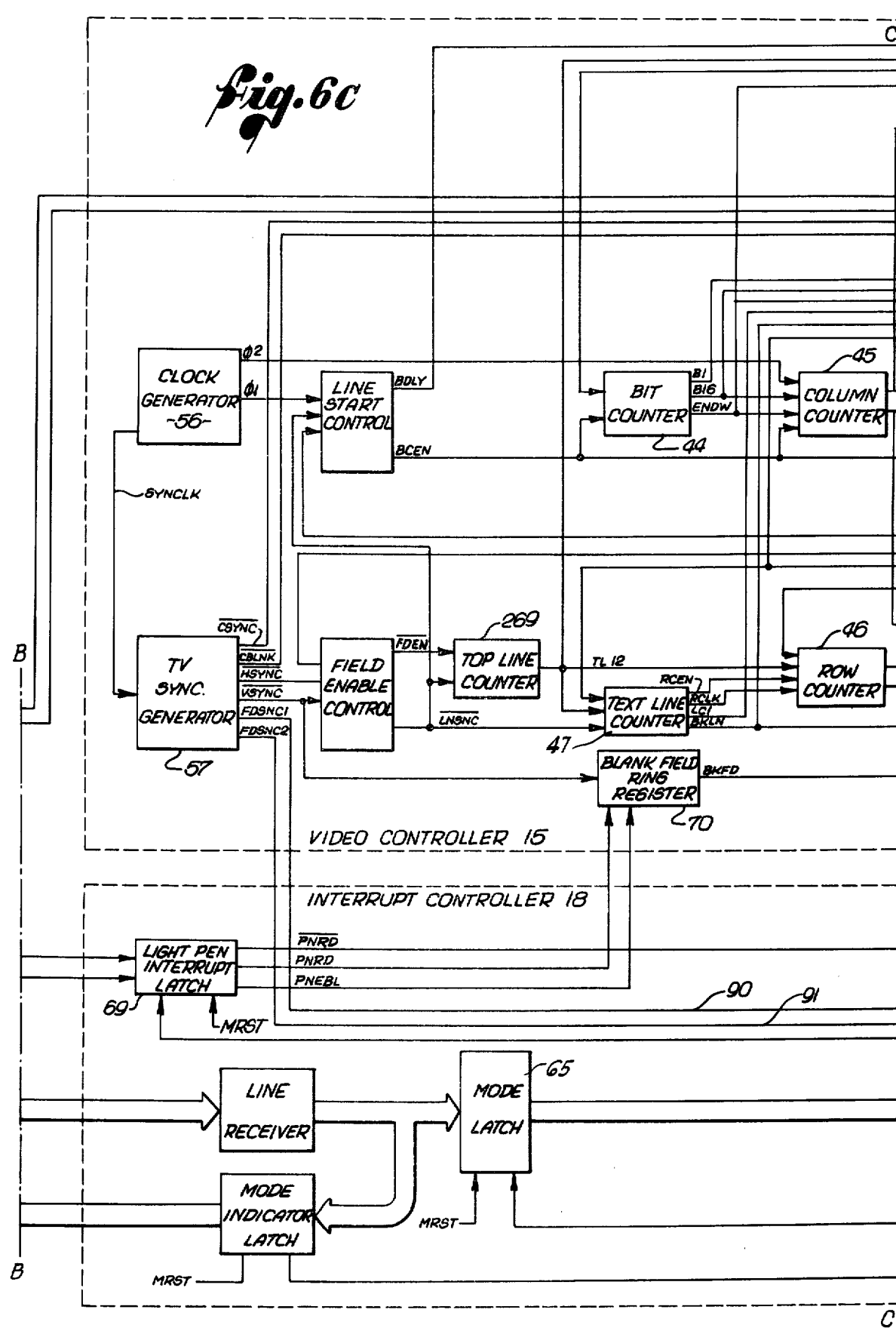

| F1W1L1 | F1W2L1 | F1W3L1 | F1W4L1 | F1W5L1 |
| --- | --- | --- | --- | --- |
| F2W1L1 | F2W2L1 | F2W3L1 | F2W4L1 | F2W5L1 |
| F1W1L2 | F1W2L2 | F2W3L2 | F2W4L2 | F2W5L2 |

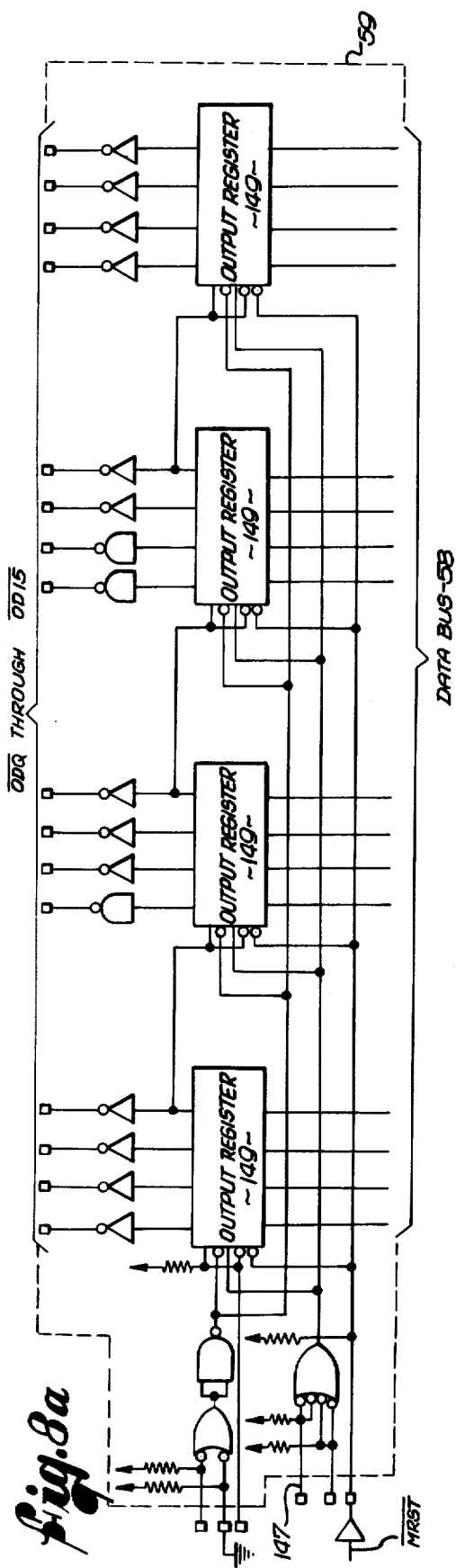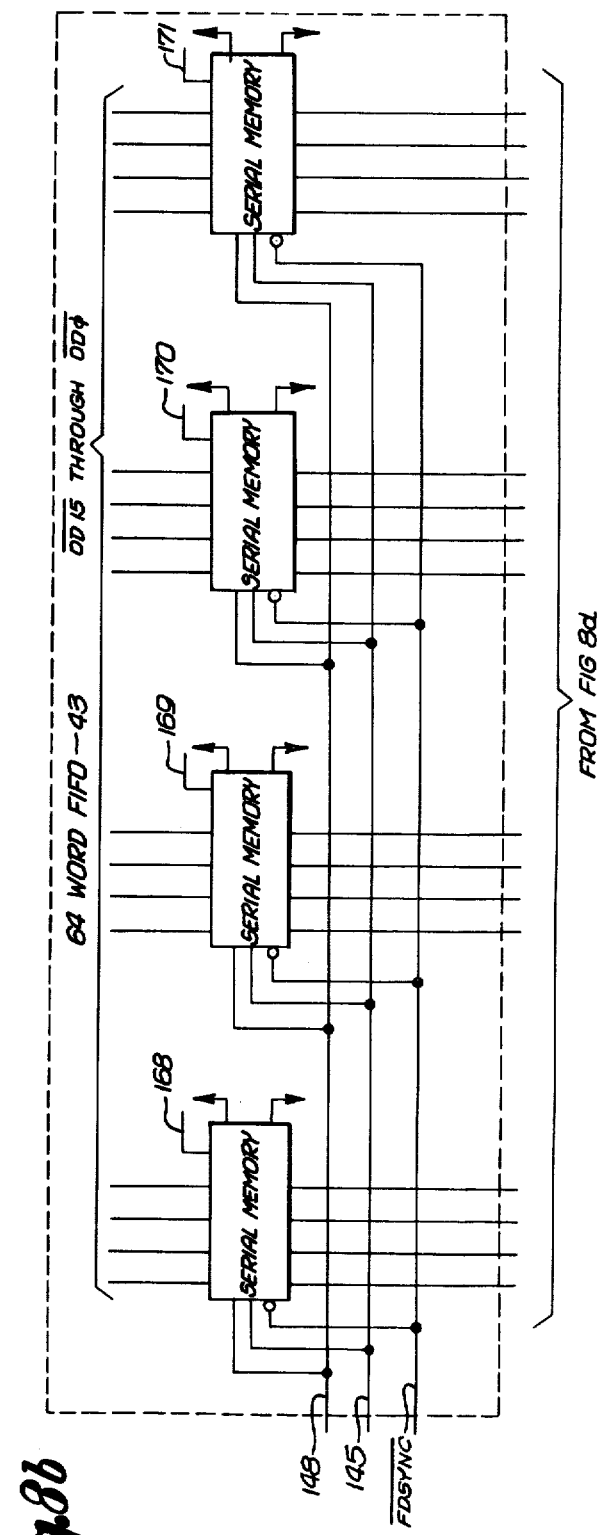

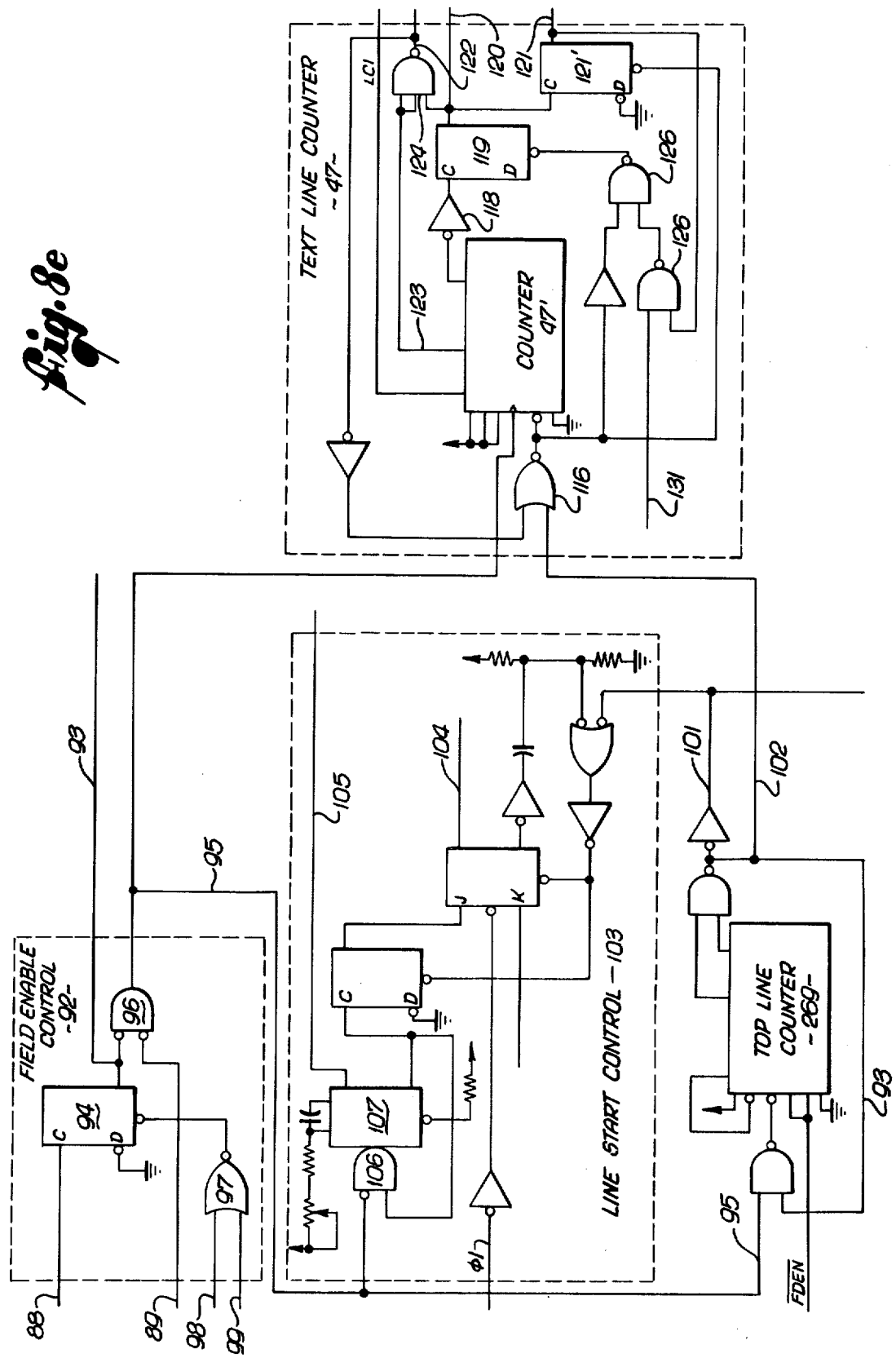

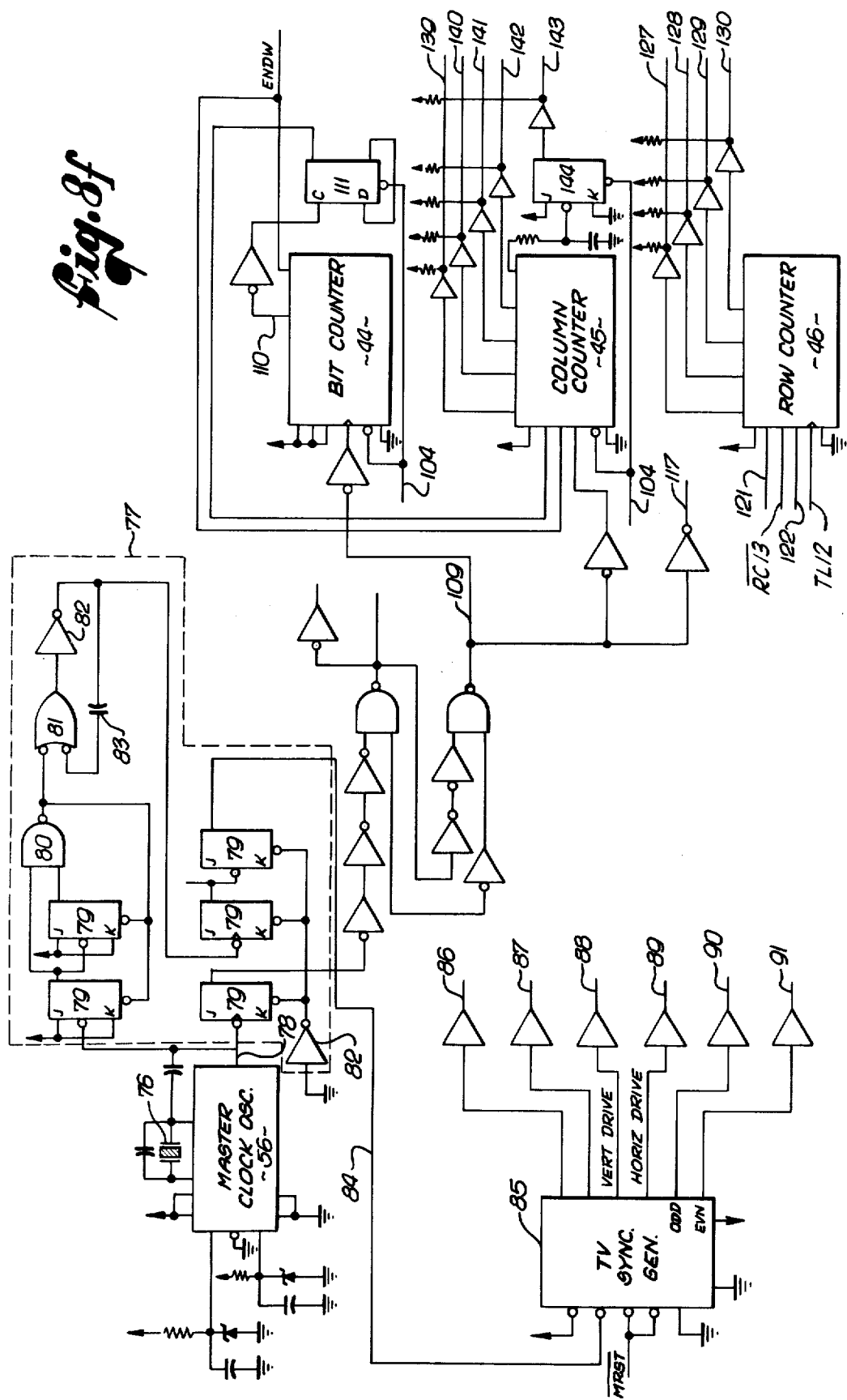

DISPLAY MARKER GENERATOR -49-

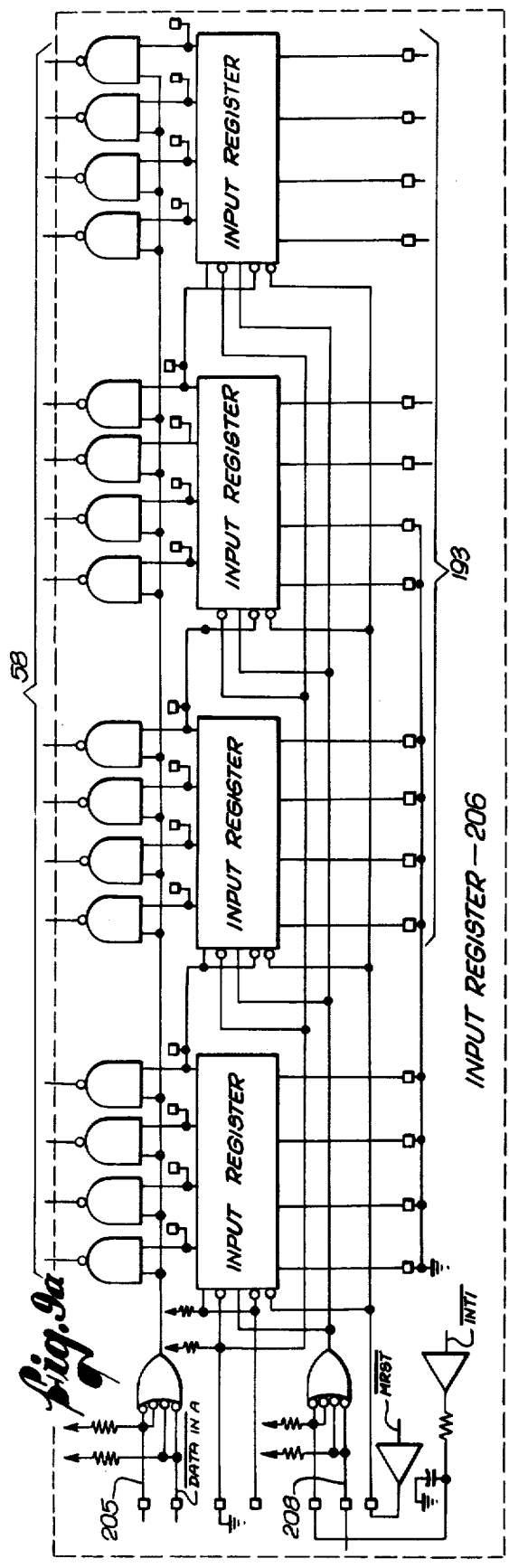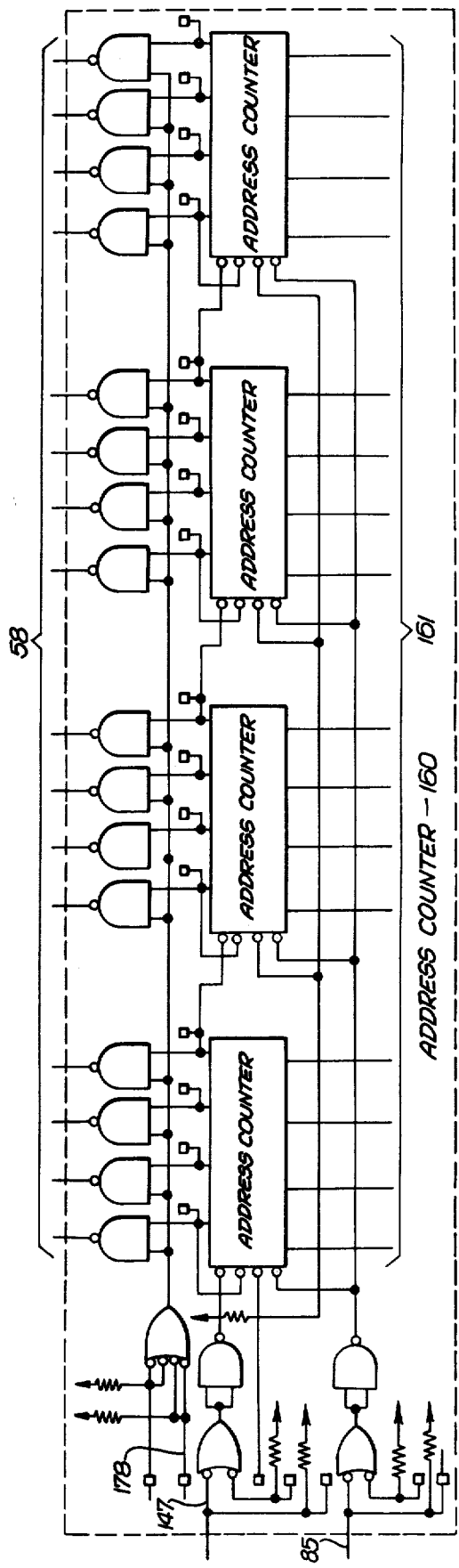

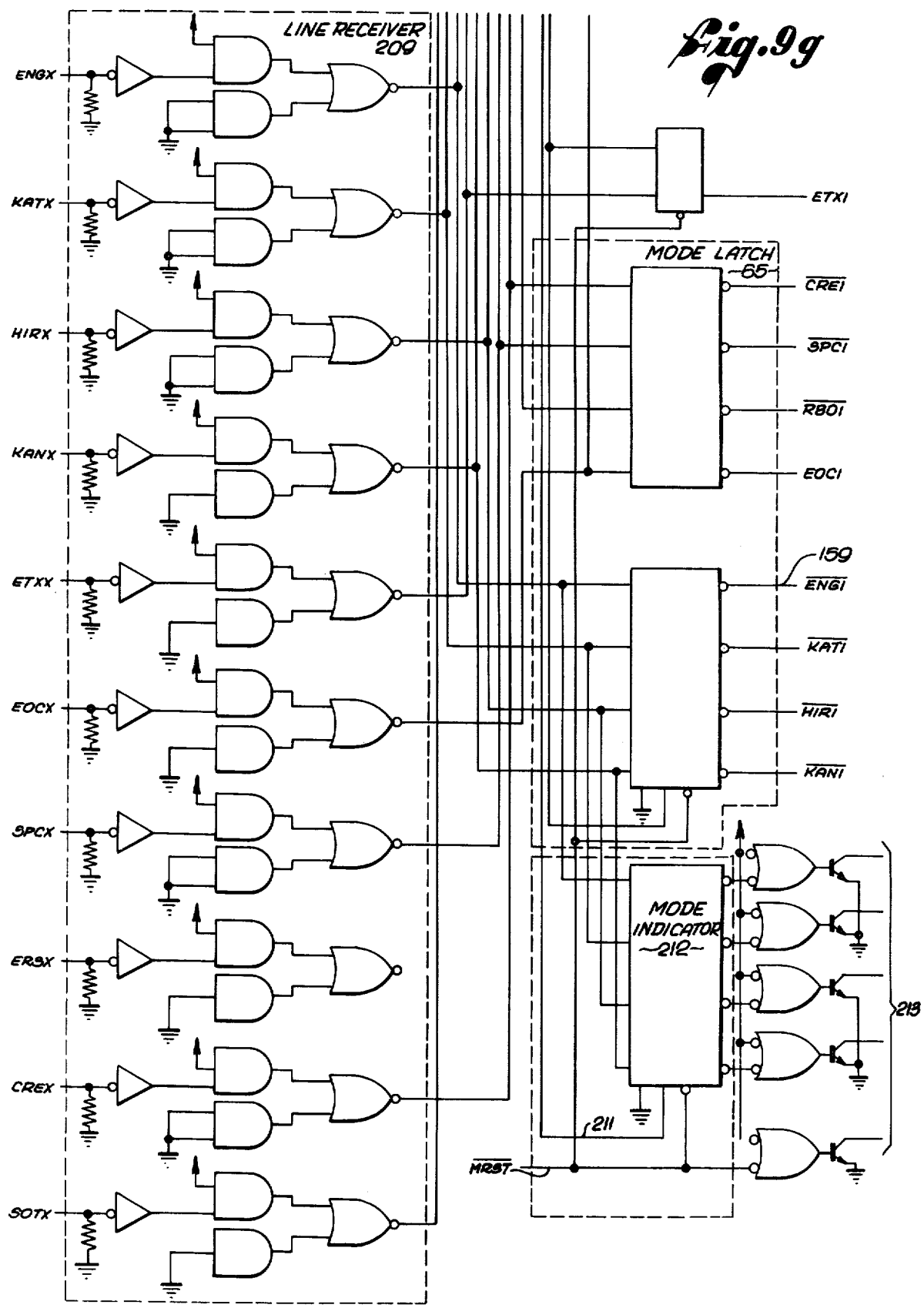

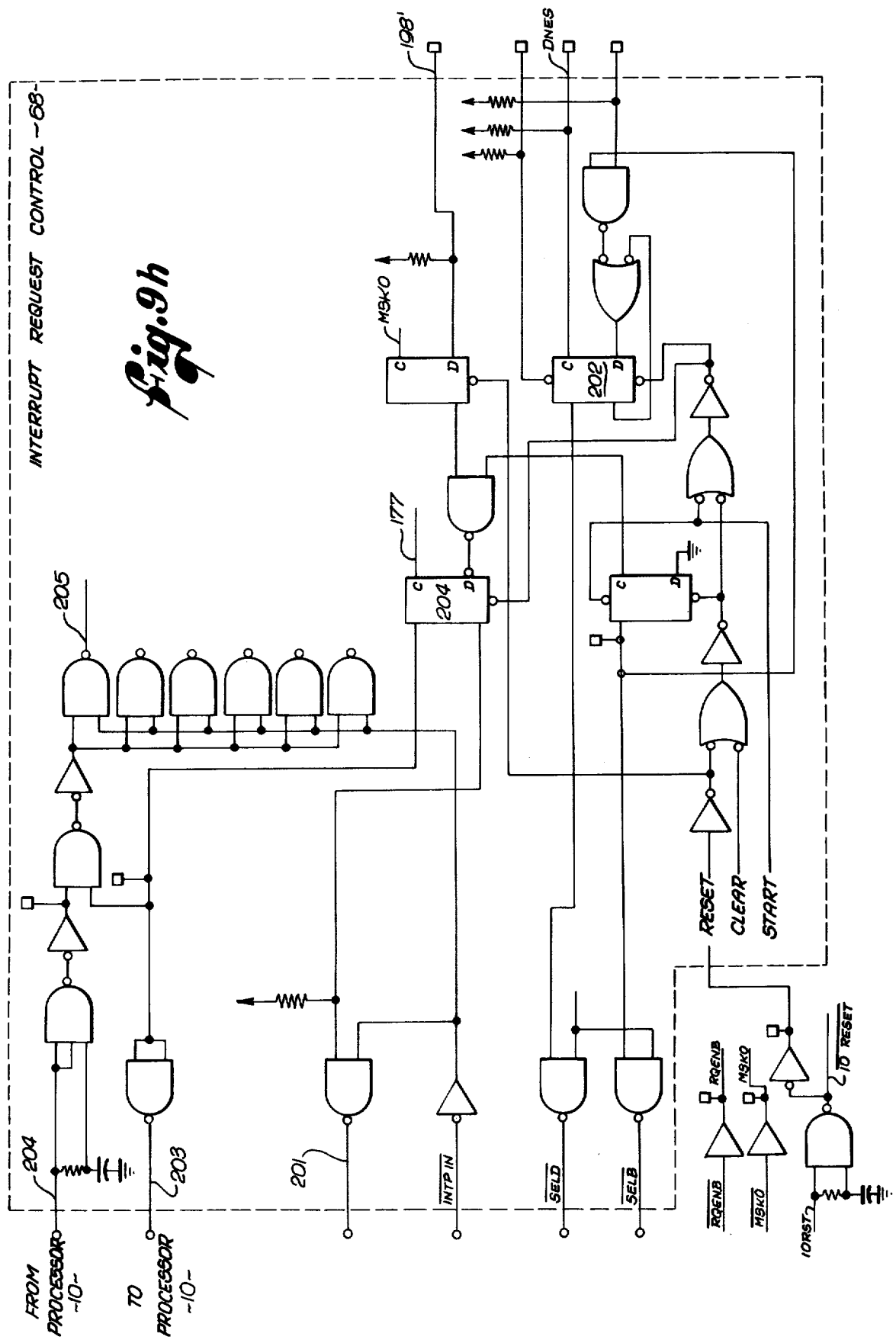

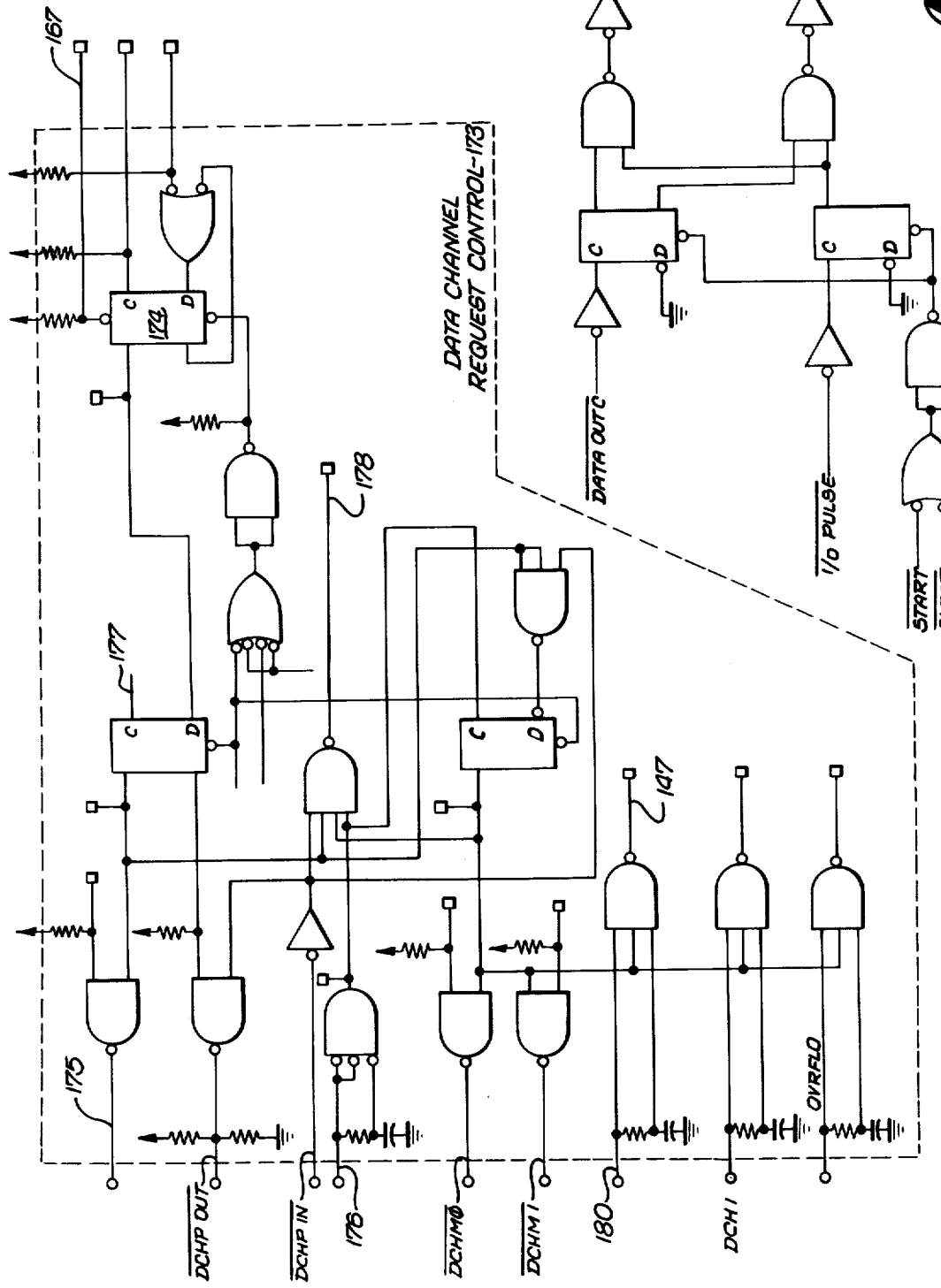

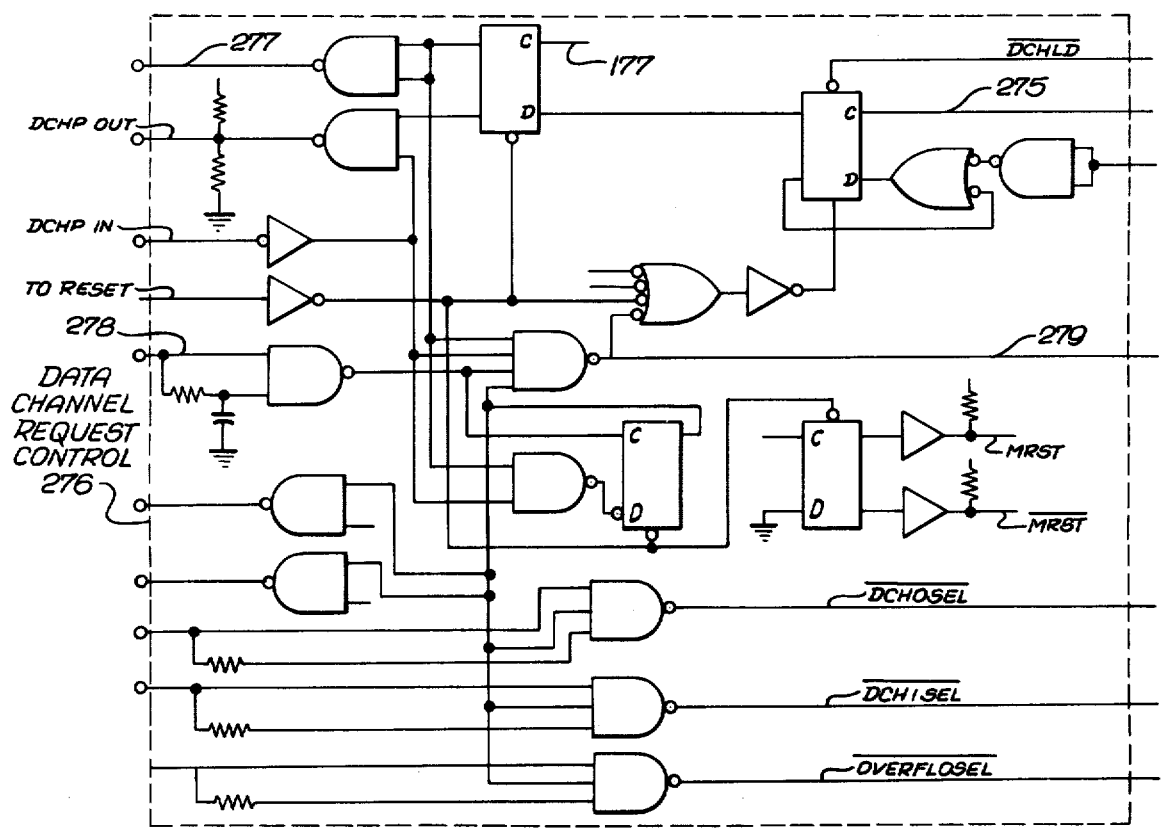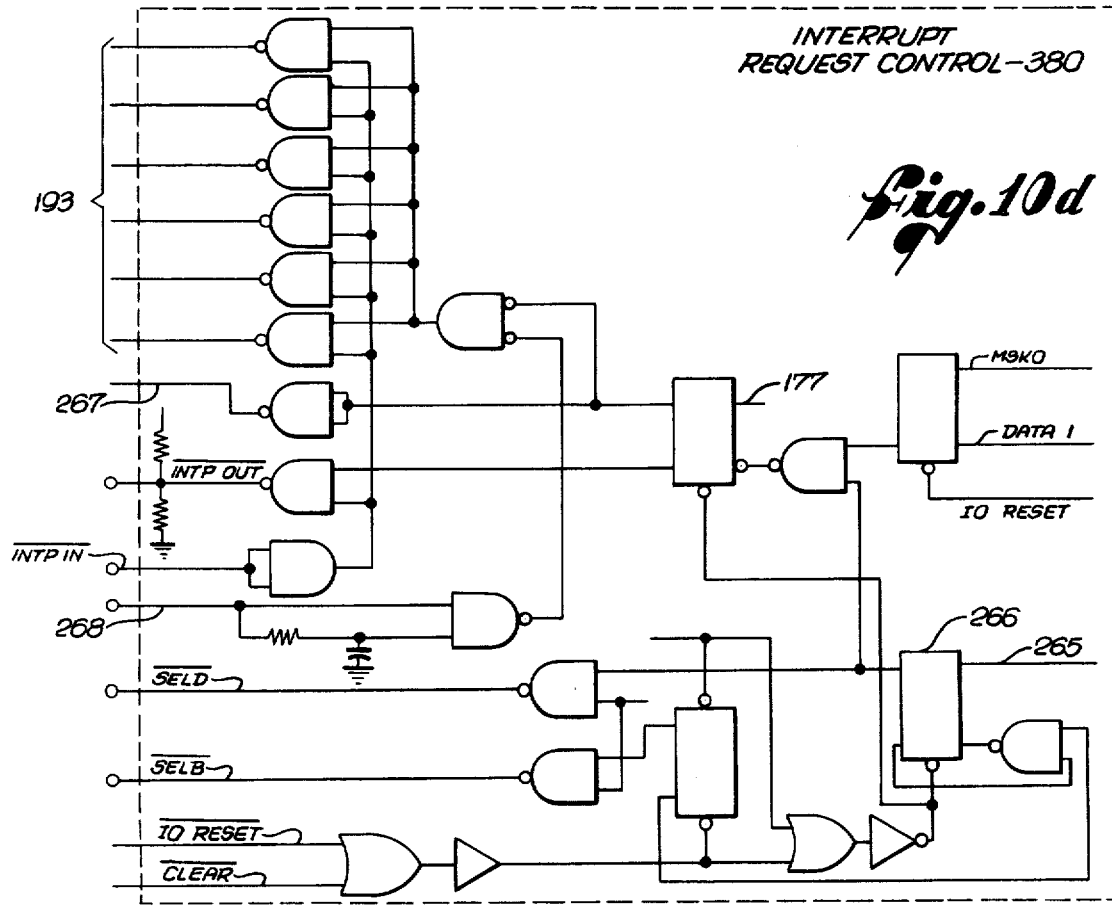
Fig. 10d

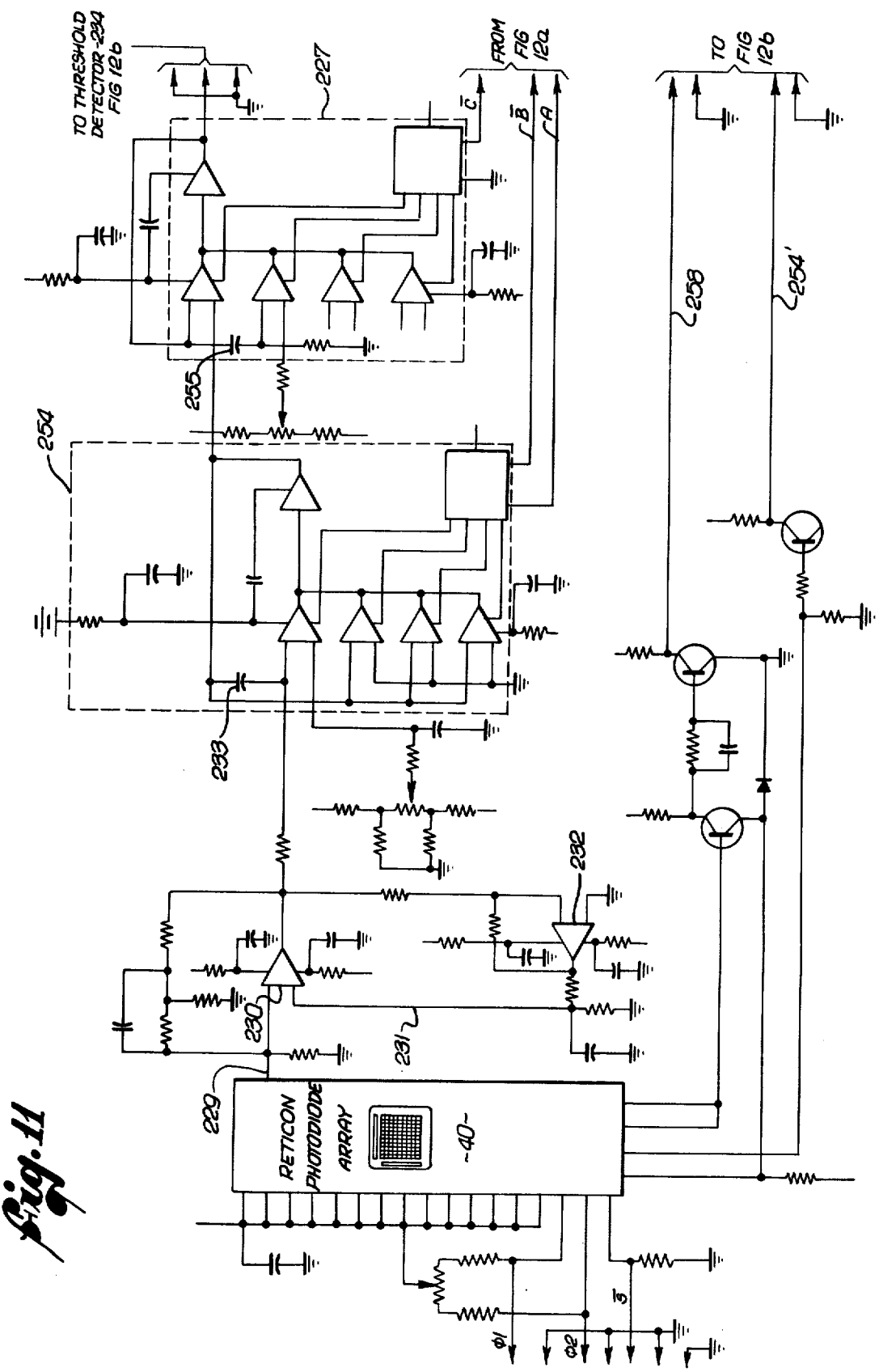

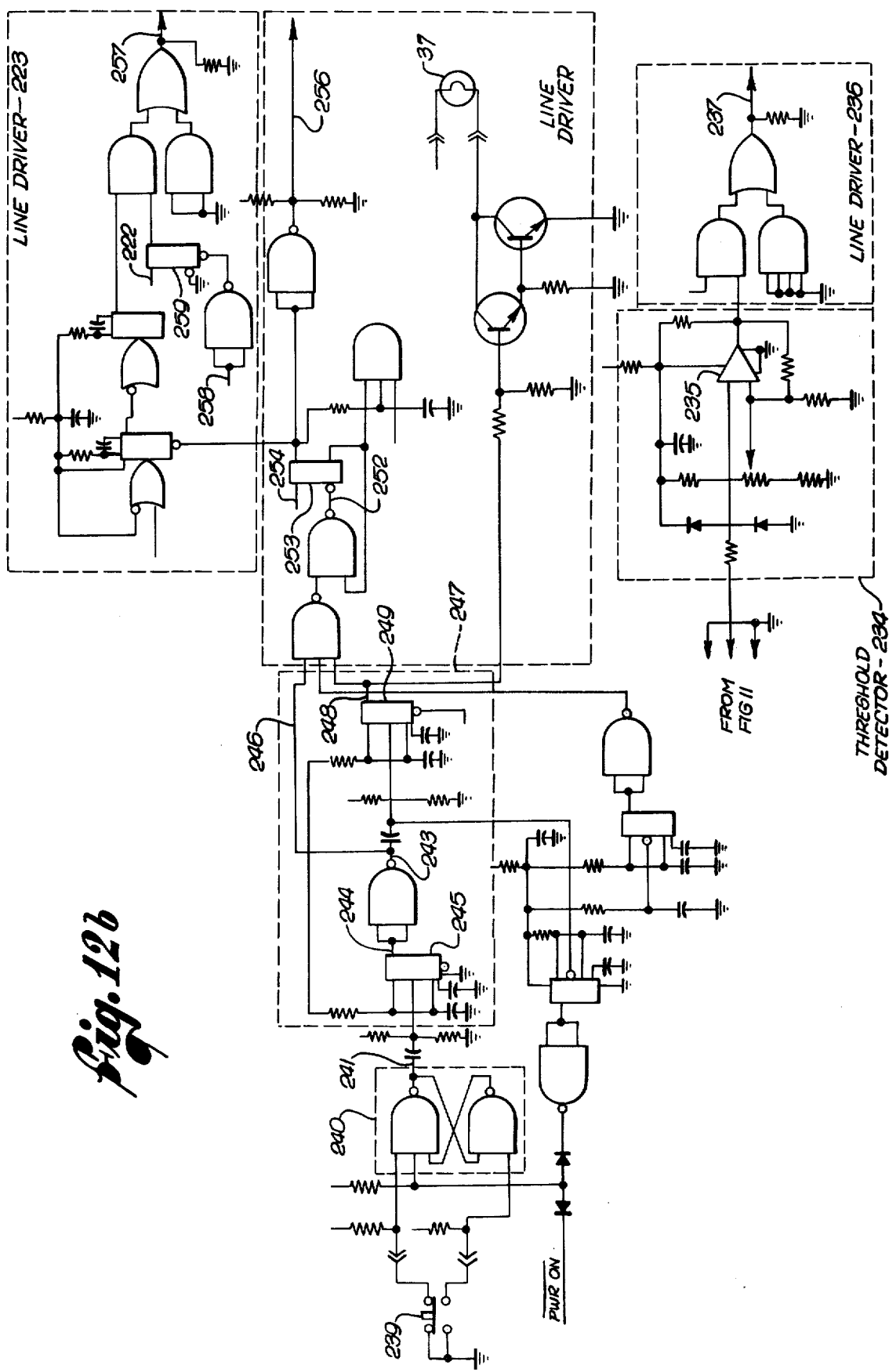

APPARATUS FOR ASSISTING IN THE TRANSPOSITION OF FOREIGN LANGUAGE TEXT

BACKGROUND OF THE INVENTION

1. Field of the Invention

The present invention relates to printing systems in which transposition is made from the language character form in which verbal material is presented to the reproduction of the material as printed text. The invention is particularly useful in transposing from one language form to another in those languages in which a number of complex printed characters all correspond to a single selected spoken sound or which there are a large number of various characters required for communications. Also, the invention can be used for providing a phonetic input base in a language and deriving an output in the form of sentences in proper gramatical structure in that same language. The invention also finds utility in translating from one language to another.

2. Description of the Prior Art

In existing printing systems that have been utilized to print text material in a language format altered from that in which the material is presented, a number of different approaches have been used. Some of these systems are reasonably successful for translating between languages and language forms which have relatively few simple corresponding characters, such as in translating between European languages, as from English to Greek or German to Spanish. These systems have been quite deficient, however, in translating between Western languages and Oriental or Arabian languages. Of particular significance in this regard are the defiencies of prior art systems in providing a means for translating material into idiomatic Japanese. While two of the language forms of the Japanese language, Katakana and Hiragana each contain a relatively few number of characters (71 in each language form), and so are amenable to adaptation to the keys of a conventional English language typewriter, Japanese text material written only in Katakana or only in Hiragana or in a combination of both fails to express the intricacies of meaning which the Japanese people impart to the spoken sounds by voice inflexion, pronunciation, accent and tone. The result is a translation into written Japanese which is very rudimentary, unsophisticated and bland to those familiar with the Japanese language. To analogize, a similar effect would result if one were to attempt to express descriptive or noteworthy material in the English language using words of no more than five letters.

To express concepts and ideas in meaningful terms in the Japanese language in written form, one must resort to the use of more eloquent language forms of the Japanese tongue, such as Yamota Gana and Kanji, particularly the latter. Thus, in conventional practice in Japan, written matter of any reasonable degree of sophistication typically employs a combination of Katakana, Hiragana, Romanji (Roman or English) and Kanji characters. Kanji is not at all adaptable to conventional keyboard typing or printing systems, however. To be even minimally conversant in Kanji, approximately 1,850 Kanji characters are required. Normal business conversation typically employs any of 4,000 different Kanji characters. Specialized usage of the Kanji language form can involve anywhere from 5,000 to 50,000 character figures.

Various systems have been suggested to encode and decode complex language character forms, such as Kanji, so that the complex characters in these language forms could be reproduced in printed text after processing by a digital processing device. One such system involved the assignment of coded digits, such as letters or numerals from a conventional typewriter keyboard to define the gross form of each complex character on the basis of the arrangement of sections in the character, and to define the shapes of elements in each section, then to define the relative juxtaposition, crossover, enclosure and size differentiation of elements within each section. Construction of the code in such an arrangement is so arduous and involves such a great possibility or error, and the digitization of the parameters has been so incomplete, however, as to render such systems of minimal practical value.

Another encoding arrangement involves a keyboard with 2,100 keys with separate Kanji characters on each of the keys. However, as previously noted this does not allow the user to conduct even basic Japanese business conversation. Moreover, the manipulation of 2,100 keys is extremely time consuming and fatiguing to the keyboard operator.

Another system which has been proposed employs a rectilinear matrix of grouped Kanji characters. The matrix involves first choosing a vertical column containing a multiplicity of different Kanji characters, choosing a horizontal row likewise containing a multiplicity of Kanji characters and intersecting the chosen column. At the intersection one chooses one of several Kanji characters, for example one of eight. An LED stylus or switching arrangment is typically employed to define the final matrix position chosen and to generate a representative electrical signal associated with that particular character position. Different laminar masks or template overlays may be employed in association with such systems to expand their capacity. However, this arrangement suffers from the same deficiencies of imposing a fatiguing strain on the operator, of being unduly arduous and time consuming and of giving rise to frequent errors.

Another prior art translating arrangement involves a keyboard which utilizes one of the simple Japanese language forms the characters of which find correspondence in a plurality of characters of a more complex language form, such as Kanji. Depression of an appropriate keyboard key labelled according to the simple language form displays on a cathode ray tube all characters having the same sound, as well as an eight digit code associated with each displayed Kanji character. The keyboard operator must first depress the appropriate key of the console and then mentally select the appropriate one of the many Kanji characters displayed on the CRT having the same sound, and copy down the eight digit code appearing therewith. As with the other prior art arrangements discussed heretofore, this type of system is extremely slow and cumbersome. Also, because of the movement of attention from the keyboard to the display to the code copy sheet to the text, this arrangement is very incohesive and lends itself to the preparation of a text which is somewhat disjointed in its final form.

It would be desirable, therefore, to provide an apparatus for assembling material for a printed text which maintains a display of the text material as it is developed and which concurrently displays character forms from which further text characters may be sequentially selected.

SUMMARY OF THE INVENTION

In accordance with the present invention, an apparatus is provided for generating a text of information in a language form comprised of first and second sets of characters, wherein each character or group of characters of the first set bears a predetermined relationship to a character or group of characters of the second set. The apparatus comprises memory means for storing in a binary digital format each of the first and second sets of characters comprising said language form; first selection means for selecting individual ones of the first set of characters for inclusion in the text of information being generated; and display means for displaying the first and second sets of characters. The apparatus also comprises processing means coupled to the first selection means and to the display means and including means responsive to the selection of each character of the first set by the first selection means for automatically accessing the selected character of the first set in binary digital format from the memory means, means for controlling the display means to display the accessed character of the first set in a first display area as part of the text of information, means responsive to the selection of each character or group of characters of the first set that bears said predetermined relationship to a character or group of characters of the second set for automatically accessing the character or group of characters of the second set in binary digital format from the memory means, and means for controlling the display means to display the accessed character or group of characters of the second set in a second display area. The apparatus additionally comprises second selection means for selecting a desired character or group of characters of the second set displayed in the second display area for substitution in the text of information of the selected characters or group of characters of the first set that bears said predetermined relationship toward the selected character or group of characters of the second set. Further, the processing means is coupled to the second selection means and further includes means responsive to the selected character or group of characters of the second set for automatically substituting the selected character or group of characters of the second set for the selected character or group of characters of the first set by controlling the display means to display the selected character or group of characters of the second set in place of the selected character or group of characters of the first set in the text of information displayed in the first display area.

In its preferred form, the invention involves a cathode ray tube divided into a text display section and a character font display section. As the text is developed, the separate characters of the text appear sequentially in the text display area. At the same time, the characters from which the text is to be developed are displayed in the character font display portion of the cathode ray tube. The invention is uniquely adapted to effectuate prompt selection of characters from language character forms that employ a great multiplicity of different characters. This is possible because of the second order display and selection arrangement utilized. For example, to translate material originally presented in English into written conversational Japanese, the selection of each of the sequential characters in the text material is initiated by the selection of a Hiragana or Katakana character or combination of characters displayed in the character font display portion of the cathode ray tube.

The Hiragana or Katakana character selected would be those characters corresponding to the English language equivalent phoenetic sound to be translated. If the selected character were inappropriate for use in conversational written Japanese, however, the selection of the Hiragana or Katakana character under a Kanji selection mode would be followed by a display of up to a predetermined number of Kanji characters having an oral sound similar to that of the chosen Hiragana or Katakana character. The console operator would then visually select the appropriate Kanji character and, with a single action, cause it to be selected as the final character to appear in the next sequential text character location. The action resulting in the Kanji character selection in each instance involves but a single swift movement by the operator. The selection medium may be a light pen which need merely be pointed at the selected character displayed in the character font display portion of the cathode ray tube and then actuated. Alternatively, a keyboard may be provided with conventional keys. However, a corresponding keyboard layout could be made to appear in the character font display portion of the CRT. When different ones of the characters are accessed out of encoded storage, they appear in one of the key locations in the keyboard format displayed on the cathode ray tube. Depression of the corresponding key in the keyboard would designate the character to appear in the next text character position, and would cause an encoded representation of the character to be stored and to be available for printing later.

A further feature of the invention is to provide apparatus which may be utilized to compose and produce a text of printed material in any one of several different language forms. For example, encoded representations of Romanji (English), Katakana, Hiragana and Kanji may be stored in the device, and text material may be printed in any one of these language formats. It is to be understood that utilization is not limited to the combination or any of these language forms separately. To the contrary, the invention has application to even most complex and obscure language form character systems. Compositions may be developed in any conceivable language including Sanskrit, Chinese, Korean, Hindi, Hindustani, Arabic as well as languages having more familiar aphabetic type characters, such as Greek and Russian.

It is a further feature of the invention to provide a message formating system for use with complex languages having a multiplicity of characters in which the features of conventional sophisticated word processing systems used in English and other Western languages are available. That is, backspacing, centering, margin control, editing and other features found in existing electronic typing systems are available for utilization with the present device. This is possible only because the character selection procedure for the complex language forms is so simplified by the present invention that the addition of these control functions does not make the system uncontrollably complex.

The apparatus of the present invention is also suitable for use in satellite operation, whereby a number of different operators each stationed at a separate console would have access to the control and storage functions offered by the present invention. Thus, a single central processor and control system is allowed to service a number of different stations which could draw on the information stored at a central location.

A further feature of the present invention involves the flexibility of the types of component devices suitable for use therewith. That is, character selection may be performed through a light pen or keyboard arrangement, as previously described. Alternatively, character selection could be achieved through the use of an acoustic sensor or touch panel overlays. Similarly, control functions can be performed either through a touch panel or keyboard, or by the use of a "mouse" which is a device employed to move a cursor about the face of the cathode ray tube.

Possible command functions can be displayed on the cathode ray tube, and the cursor can be directed to a selected one of these command functions. When the cursor is in an area of the cathode ray tube associated with the desired function, an actuating signal can be sent to cause the system to perform the desired function. Thus, a considerable number of different control functions can be sequentially performed without requiring a separate key on a keyboard to be associated with each function. Both text and graphic processing including erasing or "painting" of subject matter, editing, centering, and altering size, contrast and resolution may be performed.

A further desirable feature of the invention is that text characters, as they are developed, can be digitally encoded into a standard word processing code, for example ASCII or JISC. Once so encoded, the text information can be repeatedly utilized in a wide number of operations and in connection with different machines operating on the standard codes.

A further feature of the invention is to provide means by which infrequently used characters of a complex language character form can be introduced into a message text. This is achieved by utilizing a optical digitizing accessory connected to the storage unit of the invention. A rectilinear matrix of photosensitive elements is optically coupled to a window against which a card containing a new handwritten character is positioned by the operator of the transposing device. The card is illuminated and each of the photosensitive elements in the array is queried to produce a string of digital binary bits subdivided into words which in their totality define the character inscribed upon the card. This information is passed to the text storage area of the device for display as text information. In addition, the previously untabulated character is then reproduced in its proper character position in the final printed text material.

DESCRIPTION OF THE DRAWINGS

FIG. 1 is a perspective view of the console arrangement of one embodiment of the invention.

FIG. 1a is an elevational view of an alternative CRT display arrangement to that depicted in FIG. 1.

FIG. 2 is a diagram useful in explaining the encoding of a Kanji character.

FIG. 4 illustrates the cathode ray tube face in the final selection mode.

FIGS. 6a through 6e are each magnified portions of FIG. 6 and fit together along the corresponding lettered reference lines AA through EE.

FIG. 7 illustrates word and field arrangements of the display on the cathode ray tube.

FIGS. 8a through 8g are component portions of a detailed schematic diagram of the video controller of FIG. 6.

FIGS. 9a through 9i are component portions of a detailed schematic diagram of the interrupt controller of FIG. 6.

FIGS. 10a through 10d are component portions of a detailed schematic diagram of the optical digitizer controller of FIG. 6.

FIGS. 11 and 12a and 12b are component portions of a detailed schematic diagram of the optical encoder of FIG. 6.

FIG. 14 is a side view of the friction operated "mouse" with the cover removed.

DESCRIPTION OF THE EMBODIMENT

FUNDAMENTAL ORGANIZATION

Figure 5:
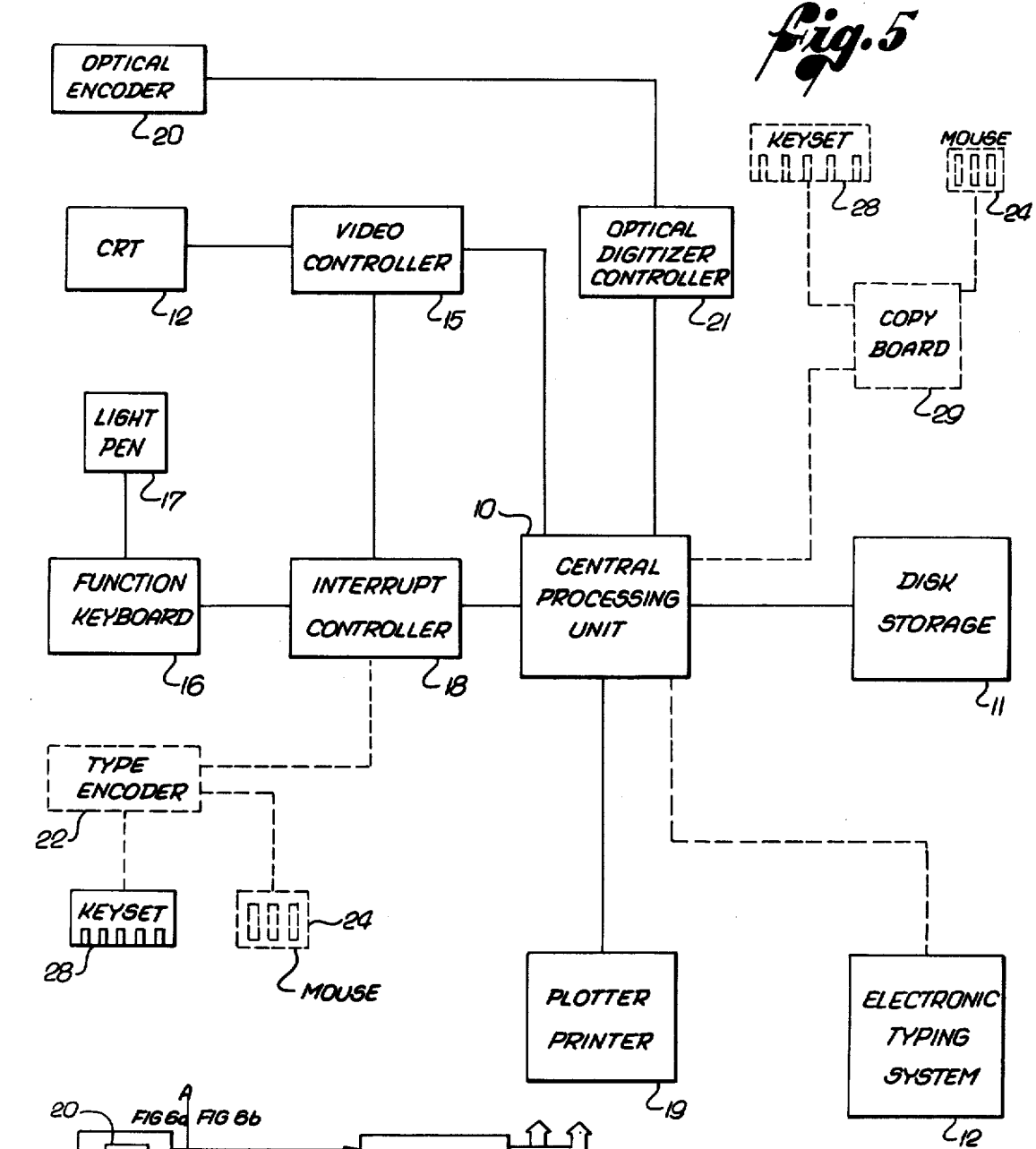
FIG. 5 is a basic block diagram of the elements of the embodiment.

FIGS. 1 and 5 illustrate the major components of the invention. Together, the components illustrated form a machine for transposing a verbal composition from one language form to another. Transposing, as this term is used, is intended to mean the process of producing a text display in a language form different or altered from that of the source material. The principal application is to producing a text in printed form using language characters from one of several language character fonts, all of which represent the same audible sound in the spoken language to which they pertain. Examples of different character fonts in the Japanese language are Katakana, Hiragana and Kanji.

A central processing unit 10 (FIG. 5) serves as an electronic data storage device for maintaining encoded digital forms of the various language characters in storage positions as they are compiled to form text material. The central processor 10 also generates command functions which govern the transfer of data among the various system components. Associated with the central processor 10 are one or more disk storage units 11 which expand the memory storage capability of the system and are used to store at least some of the characters in a number of different language character systems in binary encoded form. In the embodiment depicted herein, the disk storage unit 11 stores libraries of binary encoded representations of all of the Romanji or English language alphabetic characters, as well as each of the 71 Katakana and Hiragana Japanese characters, and in addition about 2500 Kanji characters. The system also includes a cathode ray tube 12 which is a conventional EIA-RS-330 television monitor for providing a standard video raster display of 525 lines in two different fields. The cathode ray tube 12 is divided into a upper portion 13 for displaying visual images of the text characters in their appropriate positions as they are compiled into the message text, and a lower portion 14 for displaying the characters in a character font from which the text is compiled. Alternatively, separate cathode ray tubes could be employed for displaying the text and character font information separately. A video controller 15 is provided to transmit signals from the central processing unit 10 to continuously refresh the display on the cathode ray tube 12. The video controller also periodically transmits requests for display refreshment from the cathode ray tube to the central processor 10.

The system also includes a function keyboard 16 by means of which the operator of the transposing device can initiate certain control functions. Through the function keyboard, 16, the operator can specify the language form or combination of forms which may be utilized in the composition of text material. Associated with the function keyboard 16 is a light pen 17 which is utilized to coact with the cathode ray tube 12 to select the specific character from the character font displayed in the lower portion 14 of the cathode ray tube 12 to appear in the next sequential text character location in the upper portion 13. Instructions from the light pen 17 and the keyboard 16 are transmitted to the central processing unit 10 through an interrupt controller 18 which establishes a priority of access to the central processor 10 and which alters the display on the CRT 12 through a connection to the video controller 15 when it receives directions from either the function keyboard 16 or light pen 17.

The system preferably also includes a matrix printer/plotter 19. Because of the variety of image patterns that can be produced with a plotter/printer, this type of output device is especially appropriate for use with the complex language character figures with which the transposer of the invention finds its greatest utility. One valuable accessory to the fundamental elements of the invention is the optical encoder 20. This device allows an operator to introduce untabulated characters into the system by hand printing these characters on cards provided for this purpose. The optical encoder 20 then senses the inscriptions on a card inserted therein through photosensitive elements. An optical digitizer controller 21 transforms the resultant photosignals into a digitally encoded bit pattern in the format corresponding to the bit patterns associated with the tabulated characters maintained in the disk storage library. The optical digitizer controller 21 transmits this bit pattern to the central processing unit 10, which stores it at an addressable location corresponding to the next sequential character position to appear in the text material.

CENTRAL PROCESSOR

The central processing unit 10 is a programmable data processing unit and may be the computer designated as the Nova 800 by Data General Corporation. This is a 32K machine which utilizes about 16K of its memory storage locations for storing the bit patterns corresponding to particular characters in one or more different language forms as they are to appear in the printed text. The other 16K is for stored operating program. The bit patterns are stored at sequentially addressable core memory storage locations which are accessed out of memory by the video controller 15 for display in the text display portion 13 of the cathode ray tube 12.

DISK STORAGE

Because of the limited memory storage capacity of the central processing unit 10, the memory contents in the text storage area of the central processing unit 10 are periodically transfered to one of two binary storage disks in the disk storage unit 11. The disk drive systems employed may be the model 33 Dual Disk Drive produced by Diablo Systems Inc. The character text information may be conveniently transmitted to the disk storage 11 when all or nearly all of the character positions in the text display portion 13 of the CRT 12 are occupied. In addition to serving as a temporary memory storage device, the central processing unit 10 also provides the control signals necessary to the operation of the system. In addition to transmitting text information to disk storage 11 in the manner described, the central processor 10 also draws stored text information from disk storage 11 at the completion of the text for transmittal to the printer 19. Central processor 10 likewise draws on the library of disk storage unit 11 to obtain the bit patterns of the characters stored therein for use in refreshing the images displayed in the character font display section 14 of the CRT 12 in response to requests for refreshment or update from the video controller 15. In addition, the central processor 10 responds to instructions and control information provided by the operation from the function keyboard 16 through the interrupt controller 18, and also receives encoded signals associated with untabulated characters from the optical encoder 20 and transmits these signals for display on the CRT 12 in the appropriate text character positions.

PRINTER

The printer 19 is a matrix plotter type printer and may be the type manufactured as the Model 7000 by Verastac Corporation. This type of printer responds to the encoded bit patterns representing the text characters transmitted to it by the central processor 10 by creating a multiplicity of dots on text printing paper to a variable resolution. For example, when the printer is adjusted to produce 200 dots per square inch, a good quality printed text is produced. At the completion of text creation for each page, a hard copy output of the displayed page may be obtained from the printer by depression of the end of text (ETX) key in the function keyboard 16, as illustrated in FIG. 1. An alternative printer which may be employed is a SLOT printer manufactured by Xerox Corporation. The SLOT printer operates on a similar principal of producing light or dark areas on a contrasting background at particular points in a raster scan across hard copy.

ELECTRONIC TYPING SYSTEM

In addition to, or instead of, the plotter printer 19, an electronic typing system 12 can be connected to the central processing unit 10 to print out message text information in hard copy form. One type of electronic typing system is the model HY-TYPE II manufactured by Diablo System, Inc. This type of printer employs a rotating wheel the spokes of which carry particular letters or characters which are sychronously deflected by a hammer against an inked ribbon to form printed characters on paper positioned about a platen. An electronic typing system is somewhat less flexible than a plotter or scanning type printer, however, because it has a limited character capacity. That is, the number of characters are limited by the number of spokes on the print wheel. Thus, while suitable for language forms having a relative few number of basic characters such as Katakana, Hiragana, English, Russian, Hebrew and others, commercially available electronic typing systems do not have the capacity required to print language character forms employing a multiplicity of distinctive characters, for example the Japanese language character from Kanji.

FUNCTION KEYBOARD

The function keyboard 16 is a central feature of the operator terminal depicted in FIG. 1. Different keyboard functions are required or desirable depending upon the particular language form transposing operations to be effectuated. In the embodiment depicted in FIG. 1, the function keyboard 16 is designed to transpose among various of the Japanese language forms, and between English and the Japanese language. The function keyboard 16 includes several buttons. A start text button initiates controls that allow a text message to be formated. Depression of the start text key (STX) will enable the CRT 12 and will provide a signal to the central processor 10 that initiates implementation of the programs steps stored therein. Depression of the ENGL button reads in English language characters, or Romanji, from disk storage 11 into the central processor 10 and allows the CRT 12 to display English language characters in the character font display 14 and as selected in the text display location 13. Similarly depression of the KATA button or HIRA button reads in Katakana or Hiragana respectively from the disk storage 11. Depression of either the ENGL, KATA or HIRA buttons causes the basic alphabetic or language format characters to appear in the character font display 14 of the CRT 12. Depression of the KANJI button causes the Hiragana characters to be initially read in to the central processor 10 from the disk storage unit 11. These Hiragana characters may be displayed in the text display area 13, or alternatively the individual Hiragana characters or combinations of Hiragana characters may be used to access a plurality of corresponding Kanji characters from the disk storage 11. Once all of the Hiragana characters in a character combination have been designated in order to all forth corresponding Kanji characters, the EOC button of the function keyboard 16 is depressed. This signals that the end of the character has been defined, and that the character font display 14 should display all Kanji characters that correspond to the particular combination of Hiragana characters specified. An end of text button (ETX) disables all displays on the CRT 12 momentarily and stores the previously displayed text data in the disk storage unit 11 for later transfer to the printer 19. The SPACE button merely advances the current text character by a space to leave a blank space between adjacent text characters. The CR button is a carriage return and brings the cursor defining the current text character to a line below that previously defined in the text character display area 13.

LIGHT PEN

The light pen 17 of FIGS. 1 and 5 is used as an operator input for designating particular characters in the character font display either to be reproduced at the next sequential character position in the character text display, or which define a limited group of complex characters, one of which is selected as the next text character to be displayed in the text display area 13. The light pen 17 is placed with its operative end 21 in contact with the screen of the CRT 12 adjacent to a selected character in the character font display 14. When the light pen is in position and triggered by the operator, a signal is generated to momentarily blank the face of the CRT 12 and to cause every third field traced by the cursor of the CRT 12 to be brightened. Whe the light pen is actually illuminated by one of the bright trace lines, pulses are generated to define the location coordinates of the light pen, and thus define the particular character to which the light pen was pointed. This is achieved by ascertaining the location co-ordinates of the white trace at the instant that the light pen is illuminated by the trace. Thus, the character location and hence the character identity in the character font display are ascertained and encoded for processing by the central processing unit 10 for display in the text character display area 13 of the face of the CRT 12.

Communications between the function keyboard 16 and the central processor 10 are performed through an interrupt controller 18. Likewise, the implementation of character text display and character font display is governed by the operation of the video controller and by the interaction of the video controller 15 with the interrupt controller 18. The circuitry of the video controller 15 and the interrupt controller 18 will hereinafter be described in detail.

The CRT 12 is a conventional television monitor for displaying 525 lines in a raster from conventional video display signals. The CRT 12 is responsive to a conventional EIA RS-330 standard composite video signal which is sent to the 525 line CRT display through a 75 ohm coaxial cable.

TYPE KEYBOARD

An alternative form of character encoder may be provided in place of the function keyboard 16 and light pen 17, or in addition to it. One suitable encoder is a type encoder 22, depicted in FIGS. 1a and 5, which may be connected to the central processor unit 10 through interrupt controller 18.

In the embodiment of FIG. 1a, two different CRT's 350 and 351 are substituted for the single CRT 12 of FIG. 1. The CRT 350 is used to display text material as does the text display section 13 of the CRT 12 in FIG. 1. In addition, because the CRT 350 need not accomodate character font display information, there is room for command functions and "menu" information to be displayed in the upper portion at 352. Each different rectangular block in the command function display 352 contains a command such as "ERASE", "LIGHTEN", "FRAME" or other such commands that can be used to alter the information displayed on the CRT 350. Such command and editing functions can be entered into the system by codes entered at the keyboard of the type encoder 22 in conjunction with manipulation of a "mouse" 24 hereinafter to be described. For example, the mouse 24 can be used to manipulate a cursor to underline a word and the letter "D" on the keyboard can be depressed to delete that word. This is particularly useful in performing editing functions in connection with graphic material, such as pictorial illustrations, images of which are entered into the system by the copyboard and television camera arrangement of FIG. 5, hereinafter to be described.

The other CRT 351 of FIG. 1a is used to display character font information, as does the character font display section 14 of the CRT 12 of FIG. 1. This character font display is an image of the keyboard positions of the keyboard of the type encoder 22, and is depicted generally in FIG. 1a and in detail in FIG. 15.

Figure 15:
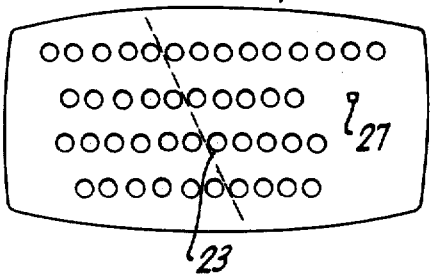
FIG. 15 is a view of the face of the cathode ray tube display operated with a keyboard input.
Figure 16:
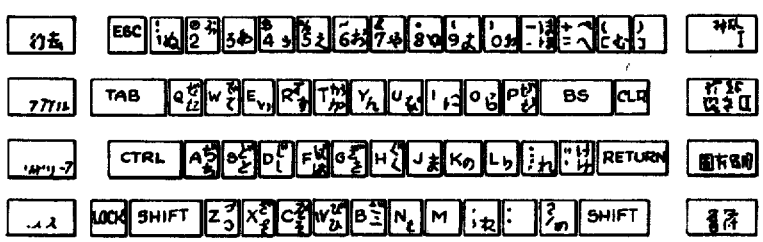
FIG. 16 illustrates a typewriter keyboard input for use with the cathode ray tube display of FIG. 15 for the operator terminal of the invention.

The type encoder 22 includes a keyboard, closely resembling that of a conventional office typewriter, but with characters in a particular language character format associated with particular keys of the keyboard, such as depicted in FIG. 16. In FIG. 16, the keys of the keyboard are labelled with the particular Romanji and Hiragana characters with which they are to be associated. Function keys to the right and left extremities of FIG. 16 are labelled with Kanji and Katakana characters that define particular functions to be performed. Depression of a particular key in FIG. 16 can be used to cause one of the characters inscribed thereon to appear in the next sequential position of the CRT 350, depending upon the language form into which the text is to be transposed. Alternatively, if the text is to include Kanji characters, for example, depression of a particular key in the keyboard of FIG. 16 will cause the corresponding image of the characters on the keys of FIG. 16 to be erased from the character font display depicted on the CRT 351 in FIG. 1a and in FIG. 15. Thus, Kanji characters may be called from memory and will appear at the 45 distinct character font positions in the character font display on the CRT 351 which positions are those depicted in FIG. 15. In the embodiment of FIG. 1, up to one hundred different characters can be displayed at any one time in the character font display section 14. If a second selection, indicating a selection of a Kanji character as that character appears in the format of FIG. 15 is not made within a predetermined time, that Kanji character is erased and subsequently replaced by another Kanji character. All of the Kanji characters which appear at any time in the display of FIG. 15 would necessarily be limited to those associated with a particular Katakana, Hiragana or Romanji character or series of characters selected at the keyboard of FIG. 16.

To encode the Kanji character of FIG. 2 working from the basic set of Hiragana characters while operating in the Hiragana mode, the operator would first depress the keyboard key in FIG. 16 bearing the letter V, and also the Hiragana character び. This key would be depressed while shifted into the upper case position so that the corresponding Hiragana character of Romanized pronuniciation "bi" would be selected. A further function selection key indicating the end of character would then be depressed, and then the Hiragana characters would disappear from the character font display CRT 351 of FIG. 15 and would be replaced with homonyms of Kanji characters corresponding to "bi". Again, the Kanji character of FIG. 2 would appear at one of the key locations depicted in FIG. 15. The location might or might not be the position 23 at which it appear in previous mode in which selections were based on Romanji characters. Wherever the character FIG. 2 appeared among the key location positions of FIG. 15, the corresponding key in FIG. 16 would be depressed, thereby causing the character of FIG. 2 to be entered in next sequential character text location position.

CURSOR ACCESSORIES

A further adjunct to the system which may be incorporated as a means for facilitating designation of characters and as a substitute for the light pen of FIG. 1 is a graphic locator or "mouse" 24. The mouse 24 is depicted in FIG. 5 and illustrated in detail in FIG. 14, and includes a roller 25 which turns by friction in contact with a flat surface, such as the table 33 of the operator console of FIG. 1. The mouse 24 has a base or support structure 355 above which a printed circuit board 356 and an electrical circuit enclosure 360 are mounted. The mouse 24 contains several spring biased push button keys 26 located at apertures in the printed circuit board 356, which, when actuated, indicate to the interrupt controller 18 in FIG. 5, a function to be performed. Two code position wheels, one of which is illustrated at 354, derive the positional information of the roller 25 and transmit that information to the central processor 10 for positioning the cursor on the face of the CRT in a corresponding manner. Code wheel shaft contact springs 357 and 358 are provided for effectuating information transfer to the central processor 10 through a cable 359. By way of example, the mouse 24 may be moved about the surface of the operator console of FIG. 1 with the roller 25 turning to bring a cursor 27 (FIG. 15) controlled by the roller 25 into position within one of the images of the key locations, for example the location 23. When the cursor 27 is moved by manipulation of the mouse 24 so that the cursor 27 lies encompassed within the circle at character position 23, one of the push button keys 26 can be actuated. This would cause a character displayed at character location 23 to be stored in memory as the next sequential text character.

The mouse 24 has a considerable degree of versatility. For example, in the performance of its programmed instructions, the central processor 10 may reach various decision points where operator input is desired. When this occurs, a plurality of possible decisions could be imaged on the face of the cathode ray tube 12. The cursor 27 need then merely be moved by the mouse 24 to designate to the central processor 10 the particular decision made by the operator in response to the query posed.

A further accessory that may be employed in association with the type encoder 22 is a key set 28 which expands the capability of operator communication with the central processor 10. That is, the depression of certain keys in a prescribed order on the key set 28 will direct that the central processor 10 take certain steps, as dictated to it by the operator.

Yet another accessory which may be employed as part of the invention is a copy board 29 which may be utilized as a means of incorporating graphic material into the text. Use of a copyboard 29 is depicted in FIG. 5 and would normally include a television camera and interface mounted atop a flat board upon which graphic material, such as a photograph or drawing is positioned. Lights would normally be mounted over the copy board to improve the quality of television transmission of an image of the graphic material to the central processor 10. An image of a photograph positioned on the copy board 29, for example, could then be encoded in the central processing unit 10 and displayed on the CRT 12, or on an axilliary CRT. The provision of a mouse 24 and a key set 28 in association with the copy board would expand the editorial capabilities available to the operator in the manner previously described. For example, a cursor, such as the cursor 27 in FIG. 15, could be moved by means of the mouse 24 across the face of the CRT 12 to designate which of several displayed editorial functions should be performed. For example, the contrast could be lightened or darkened, the upper or lower edges of the photograph could be altered, the photograph could be repositioned, etc. A copy board would be particularly useful in printing illustrated text material in which it is desired for graphic material to appear interspersed with printed character text material. Thus, books or magazine articles could be translated or transposed complete with illustrations. Such illustrations would be stored in disk storage, either at the disk storage unit 11 in FIG. 5 or in some other disk storage associated with a remote computer. The data associated with the illustrations is stored in encoded form and could be retrieved through the communication channels established for that purpose.

OPTICAL ENCODER

Figure 13:
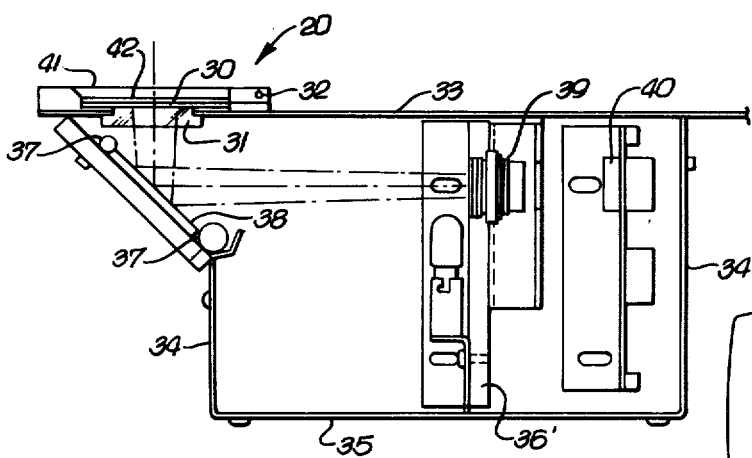
FIG. 13 is a cross sectional view of the optical encoder.

The optical encoder 20 illustrated in FIGS. 1 and 5 and in detail in FIG. 13, is a means by which the terminal operator may introduce a language character into the character text to be printed on the printer 19 even though it is not contained in the character library of the disk storage 11. To encode such an untabulated character, the operator would first inscribe the desired character on a rectangular white card 30 provided for that purpose and place the card face down on a glass window 31 on the table 33 of the operator console. Below the level of the table 33, a light sealed enclosure is defined between walls 34, a floor 33 within the light sealed enclosure a mirror 38 is positioned and light bulbs 37 are correctly positioned in the slot 32 located immediately adjacent to the mirror 38 to illuminate the card 30 through the window 31. The photosensor array 40 is mounted on an upright bracket 36 and includes a 32 by 32 rectilinear matrix array of photodiode elements. The card 30 is illuminated by the bulbs 37 to produce an image which is reflected off of the mirror 38 and through a lens system 39 mounted on the upright bracket 36' to elicit responses from the photodiodes of the photosensor array 40. The optical encoder 20 is sealed by a light tight cover 41 which is hinged to the table 33 at 32 and which includes a surrounding gasket 42 that prevents any extraneous light from outside the encoder 20 from entering the window 31. This ensures that the only light reaching the photosensor array 40 is that which is transmitted as an image of the card 30. At those locations in the image corresponding to areas on the card 30 which are inscribed with the untabulated character, activation of the photosensors immediately adjacent thereto is altered. That is, if the untabulated character on the card 30 is inscribed as a dark marking on a light background, the photosensors immediately adjacent to the lines of the image of the character will be activated to a lessor degree than those corresponding to undarkened areas of the card 30. Thus, a signal is developed indicating the light and dark areas in a 32 by 32 position matrix. The rectilinear array 40 of photosensors is thereby adapted for viewing a laminar card 30 bearing an untabulated character, for example a Kanji character, inscribed in contrast thereon.

The signals elicited from the 32 by 32 photodiode rectilinear array 40 together are combined to define an encoded bit representation of the untabulated character. This encoded bit representation is passed to the optical digitizer controller 21 of FIG. 5 for updating the contents of the central processor 10. The location at which the untabulated character information is stored is at the next sequential text character position, so that the previously untabulated character will appear in the final text as it was printed on the card 30. A variation of the treatment of the encoded bit signal associated with the untabulated character would require that the encoded bit signal be stored at an intermediate address, as specified through the light pen 17. That is, the previously untabulated Kanji character is added to the library of Kanji characters and is accessed in response to a predetermined Hiragana or combination of Hiragana characters in association with which it was created and stored. Thereafter, the encoded bit pattern associated with the previously untabulated Kanji character is always displayed as an image on the character font display area 13 of the CRT 12 during final selection of Kanji characters in response to designation of an intermediate address. This intermediate address would be associated with the particular Hiragana character or combination of Hiragana characters used to access a plurality of Kanji characters, including the previously untabulated Kanji character, from the library of the disk strobe 11.

FUNCTIONAL ORGANIZATION

Figure 6:
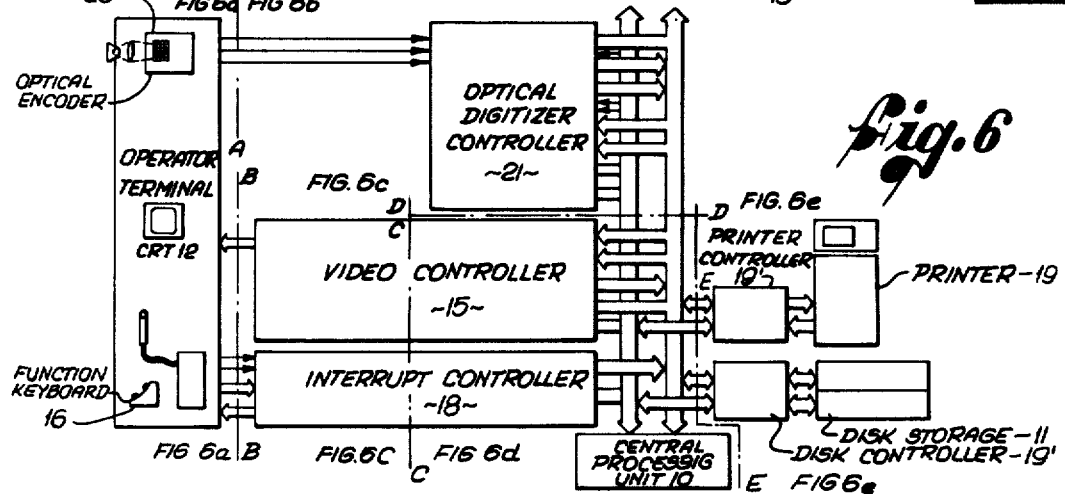
FIG. 6 is a detailed block diagram of the illustrated embodiment of the invention and indicating the layout of FIGS. 6a through 6e.

The organization of the transposing device of the invention is illustrated in FIG. 6 and in even greater detail in FIGS. 6a through 6e which are each portions of FIG. 6 with functional components specified and depicted. The electrical schematic diagrams of the system components are illustrated in FIGS. 8a-8g, 9a-9e, 10, 11 and 12. In FIG. 6, the specific interconnection of the central processing unit 10, the interrupt controller 18 the function keyboard 16 the light pen 17, the video controller 15, the CRT 12, the optical encoder 20 and the optical digitizer controller 21 are depicted. In addition, the interconnection of the printer 19 through a printer controller 19' and disk storage unit 11 through disk storage controller 11 to the central processor 10 are also indicated.

Figure 6A:
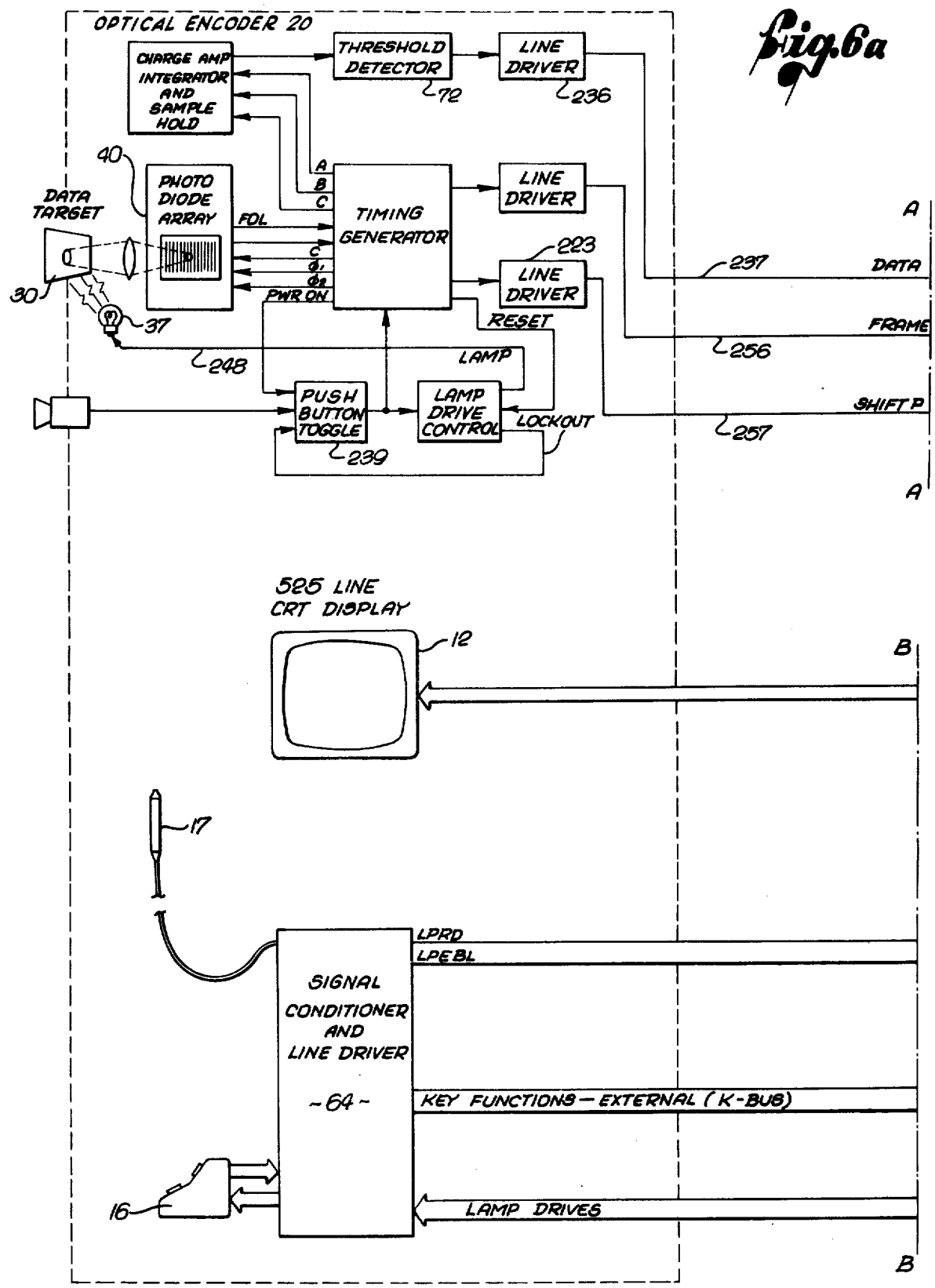
Figure 6D:
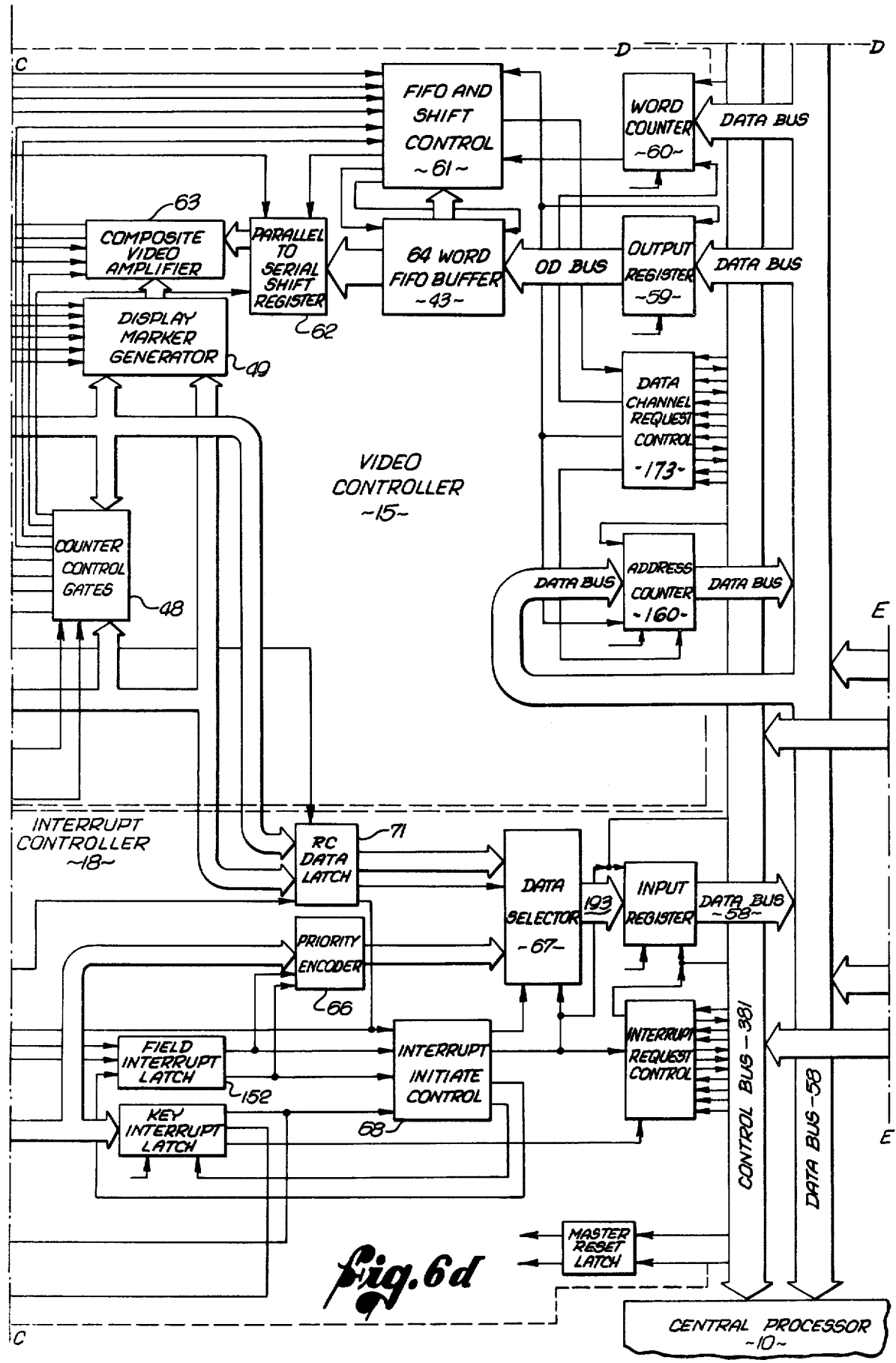
Figures 6E, 7:
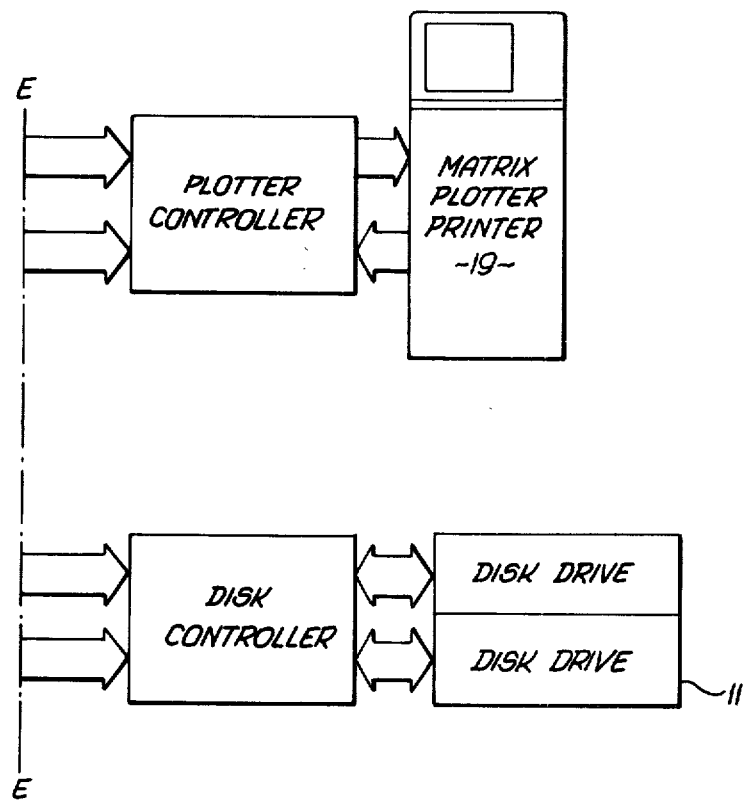

With reference to FIGS. 6c and 6d viewed together the video controller 15 controls the video data transmitted from the central processor 10 through the 64 word FIFO buffer 43. The video controller 15 also includes a bit counter 44, a column counter 45, a row counter 46 a text line counter 47, and a top line counter 269, all of which are used to ensure that information is correctly displayed in appropriate character positions on the CRT 12 in FIG. 6a. In addition, the column counter 45, row counter 46 and text line counter 47 transmit information to the counter control gate system 48 and to the display marker generator 49 to place the horizontal bright lines 50, 51 and 52 in FIGS. 3 and 4 and to place the vertical bright lines 53, 54 and 55 in FIGS. 3 and 4.

Control of the CRT display is initiated by a clock generator 56 depicted in FIG. 16c, which drives a conventional T.V. sync generator 57 to produce a raster on the CRT 12. Character information is transmitted from the central processor 10 on the data bus 58 in FIG. 6d to an output register 59, a word counter 60, address counter 160 and data channel request control 173. The Data channel request control operates the FIFO and shift register control 61 which controls the operation of the shift register 62 to cause data to be transmitted from the central processor 10 through the FIFO buffer 43, and shift register 62 and through the composite video amplifier 63 to the CRT display in FIG. 6a.

A terminal operator is able to communicate with the central processor 10 through the function keyboard 16 and the light pen 17, also illustrated in FIG. 6a. A signal conditioner and line driver 64 shape and condition the signals generated by the operator. By actuating the various key functions the operator sets the mode latch 65 in FIG. 6c and produces a response in the priority encoder 66 in FIG. 6d which in turn passes a signal to the data selector 67. Depending upon the priority of the request assigned by the interrupt request control 68, data concerning the input provided by the operator will be transmitted on the data bus 58 to the central processor 10.

Similarly, the light pen 17 in FIG. 6a actuates a light pen interrupt latch 69 which in turn actuates the blank field ring register 70 in the video controller 15. The light pen signals elicit responses from the video controller, which momentarily blanks the CRT display and indicates the position of the light pen 17 relative to the face of the CRT 12. This information is passed to an R-C data latch 71 in FIG. 6d another through the data selector 67 to the data bus 58 for transmittal as data to the central processor 10.

As previously discussed, the optical encoder 20 in FIG. 6 may be used to inscribe previously untabulated characters on the 32 by 32 photodiode array 40, depicted in FIG. 6a. This information is passed through a threshold detector 72 which is set at a predetermined level to indicate the character lines inscribed on the card 30 in FIG. 13. An encoded bit pattern associated with the untabulated character is passed from the optical encoder 20 of FIG. 6a to a serial to parallel shift register 73 in the optical digitizer controller 21 in FIG. 6b. The contents of the shift register 73 are passed through a 64 word FIFO buffer 74 to an input register 75 and then to the data bus 58.

The central processor 10 stores CRT display information in the form of a series of words within fields. Two fields are employed in interleaved fashion, each field containing one-half the display information, the fields together forming a video picture frame. An encoded bit pattern for one particular Kanji character is depicted in FIG. 2. Each square in FIG. 2 represents a single binary data bit of either zero or one, and as can be seen, the bit pattern is two 16 bit words (32 bits) in width and also 32 bits in height. As the stored bit patterns are accessed out of the central processor for display, they are rearranged in their format in modular units or words of 16 bits each for display in the interleaved fields of the video frame. That is, with reference to FIG. 7, in field 1, word 1 in row 1 is transmitted for display in the extreme upper lefthand position of the face of the CRT 12. Proceeding to the right, and still in field one, words 2, 3, 4 and 5, all within row 1 are displayed. A maximum of 20 characters may be displayed on the face of the CRT 12, and since each character is two words in width a maximum of 40 words will appear in line 1. Since the fields are interleaved, the 41st word will appear in the third line of FIG. 7 as word 1 in field 1 in line 2. Proceeding to the right, words 2, 3, 4 and 5 in line 2 of field 1 appear in sequence. Thus, one-half of the character information of the encoded bit pattern of the Kanji character of FIG. 2 will appear in field 1 in an area two words in width encompassing 16 lines. The other half of the information will likewise be two words in width and will also encompass 16 lines of field 2 interleaved with the lines of field 1. Each displayed character position is therefor a 32 by 32 dot matrix, or two serial computer words (32 bits) by 32 lines of rastor scan.

Refreshment of the display on the CRT 12 is accomplished by utilizing a high speed data channel or bus 58. The refreshing information consists of a block of 16,640 words of core memory or, 8,320 words (odd lines or even lines) of which a block is transferred sequentially at each field refresh request from the video controller 15. All text creation or display alteration operations are accomplished by altering the dedicated areas of core memory. The core field areas are then merely dumped out serially to refresh the display at the frame rate and in the pattern of FIG. 7.

VIDEO CONTROLLER DESCRIPTION

The video controller 15 develops a display presentation of 498 lines of raster scan. This includes 32 lines each for the 13 rows numbered R0 through R12 in FIGS. 3 and 4. The rows are separated by 4 blank lines each with certain exceptions. The exceptions are rows R6, R7 and R8, which are separated by 8 blank lines, and rows R11 and R12, which are also separated by 8 blank lines. At the top of the display it is necessary to blank the first 22 lines of the frame to ensure that all the text is in the display area of the T.V. screen. This leaves 37 blank lines at the bottom of the screen to fill the frame. Graphic markers are also produced in the form of solid horizontal lines 50 and 51 separating rows R6,R7 and R8, and a line 52 separating rows R11 and R12. Also, three vertical lines 53, 54 and 55 are produced separating, respectively, columns C4 and C5, C9 and C10 and C14 and C15 in rows R8, R9, R10 and R11. The framework defined by the bright lines produces phoentic character group index separation in the Katakana and Hiragana display. It should be noted that the Hiragana keyboard is also displayed in the intermediate mode of Kanji selection.

Figure 8C:
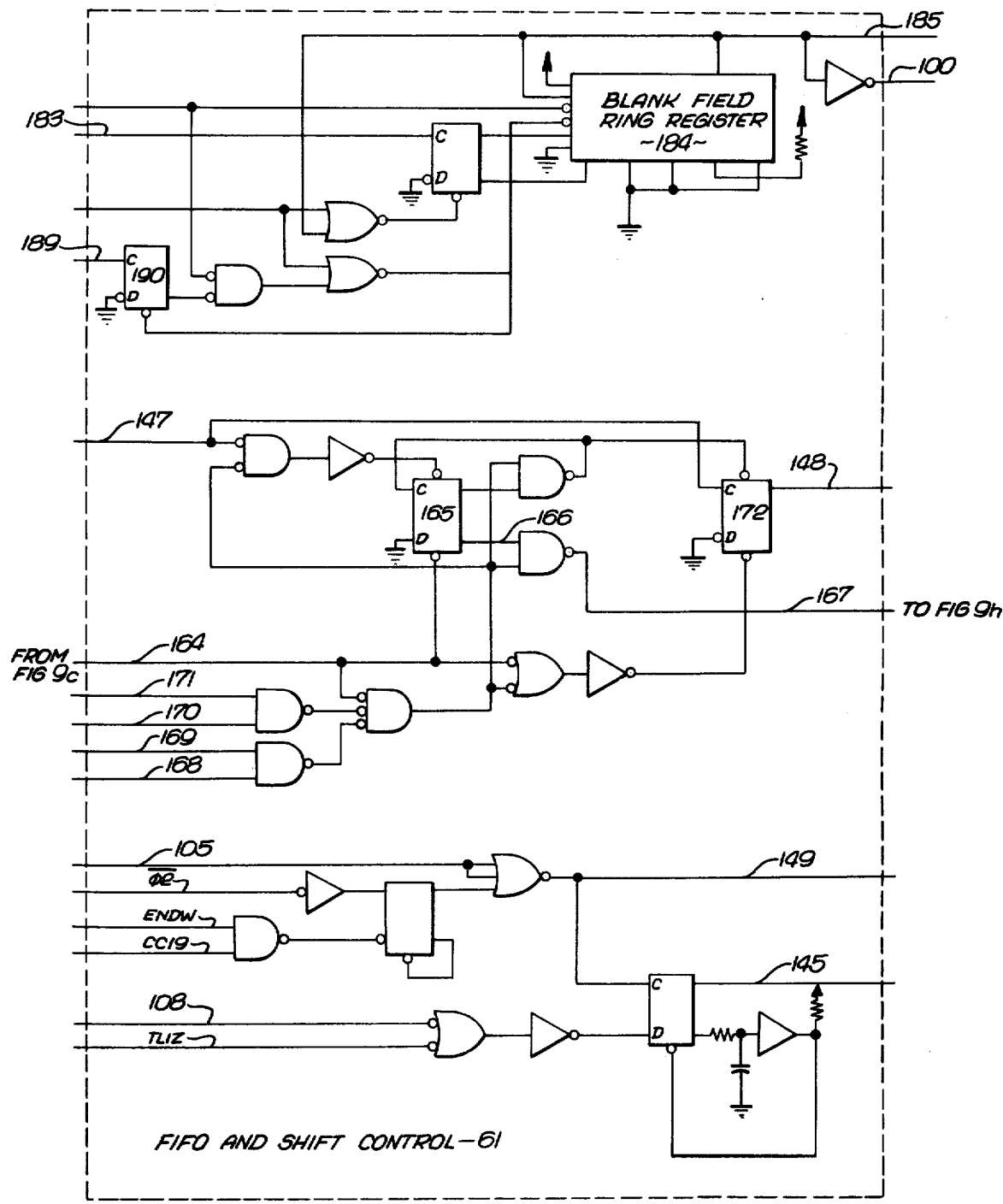

With reference now to FIGS. 6c and 6d and with further detailed reference to FIGS. 8a-8g, the operation of the video controller 15 can be described. The video controller 15 includes a master clock oscillator or generator 56, illustrated in FIG. 8f, that includes a crystal clock standard 76 of 24.570 megahertz. This basic clock rate is divided by 2 in a division circuit 77 where the the clock output 78 of the master oscillator is fed direct and as a clock input to the array of J-K flip-flops 79 connected as indicated in FIG. 8f. This produces a $\phi 1$ and $\phi 2$ non-overlapping bit clock of 12-284 MH$_2$. A NAND gate 80, an OR gate 81, inverters 82 and a capictor 83 complete the division circuit 77 and are connected as indicated. The output 84 of the division circuit 77 is a clock pulse occuring at ½ the rate of the clock pulse output 78 of the master clock oscillator 56 or 2.0475 MH$_2$.

The output 84 is a sychronizing clock pulse and is fed to an MOS-LSI TV SYNC generator 85 which is a 16 pin chip. One TV SYNC generating chip suitable for this purpose is sold by Fairchild electronics as the F3262A MOS LSI TV SYNC generator. The SYNC generator 85 produces all the timing signals required to develop an EIA standard RS-330 composite field interlaced 525 line video signal. The output signals of the SYNC generator 85 can be combined to produce composite video to any EIA RS-330 compatible TV video monitor. These signals are indicated at 86 through 89. The TV SYNC generator 85 also produces two separate markers 90 and 91 which respectively indicate activation of the odd and even video fields and are used for data synchronization.

At the beginning of each field the TV SYNC generator 85 produces a vertical SYNC pulse 88 which activates the field enable control circuit 92 in FIG. 8e causing the output 93 of a C-D flip-flop 94 to go low. This allows line sychronization pulses 95 to be developed at the output of an AND-gate 96 having inverted inputs in coincidence with the horizontal synchronization pulses 89 provided by the TV SYNC generator 85 in FIG. 8f. The flip-flop 94 is reset by the inverted output of an OR-gate 97 having an input lead 98 indicating the end of a field and also a master reset input 99. When the field enable signal 93 goes low, this allows the top line counter circuit 269 to count 12 line sychronization pulses 95, at which time the output 101 of the top line counter will go high while the inverted counterpart, the output 102 goes low, indicating the start of line 12 in the active field. This corresponds to the 24th line in the frame of the rastor scan.

The top line counter 269 the text line counter 47, and the bit counter 44, column counter 45 and row counter 46 all play key parts in developing the characters spacing and margins between characters. When the output of top line counter 269 in FIG. 8e, labeled 101 indicating line 12 in the active field goes high, the line start control circuit 103 is allowed to set the bit count enable signal 104 to go high at the first $\phi 1$ bit clock time after the falling edge of the bit count delay signal 105. The bit count delay signal 105 is developed by the line sychronization pulse 95 through the AND-gate 106 and the flip-flop circuit 107 as indicated. The bit count delay signal 105 determines the starting point of video on each horizontal raster line.

The bit count enable signal 104 is connected to the bit counter 44 in FIG. 8f and allows the bit counter to count clock pulses 109 derived from the master clock oscillator 56. Bit counter 44 is a four bit counter having a most significant bit output 110 and having an inverted input connection from lead 109 to its clock input. When the bit count enable signal 104 goes low, it clears the bit counter 44 and resets the C-D flip-flop 111. When the bit count enable signal 104 goes high it allows the bit counter 44 to count the clock pulses 109 and advance the column counter 45 every 32 bits, or two words. The bit count enable signal 104 also drives the counter control gate circuitry 48 in FIG. 8d to develop the output enable signal 114 which in turn enables the parallel to serial to shift register 62 to start shifting out data previously loaded into the 64 word FIFO buffer 43 in FIG. 8b.

The parallel to serial shift register 62 includes two parallel load, either bit, TTL shift register chips 115. Data is loaded into the shift register 62 in response to the clock pulses 117, which are merely the inverted form of the clocking signals 109 derived from the master clock oscillator $56 \div 2$ in FIG. 8f.

The occurence of a high signal on line 101 in FIG. 8e indicating that the top line counter 269 has counted 12 line sychronization pulses is accompanied by a low signal on the inverted counterpart line 102 which acts through the OR-gate 116 to release the clear signal on the counter 47' of the text line counter 47. The counter 47' then starts counting line sychronization pulses from line 95 until it reaches a count of 16, which represents the completion of a character row in one field. The output of the counter 47' is passed through an inverter 118 to a C-D flip-flop 119 that develops an output 120 which is a blank line signal. The blank line signal 120 actuates a second C-D flip-flop 121' to develop a row count enable signal at 121. The row count enable signal at 121 is applied to the row counter 46 in FIG. 8f. When the text line counter 47 causes the blank line signal 120 to go high, that signal and the row count enable signal 121 remain high during two additional line sychronization pulses on lead 95, at the end of which the row counter 46 in FIG. 8f is advanced by the row counter clock input 122 as that signal goes low.

The blank line flip-flop 119 in the text line counter 47 in FIG. 8e, once set, produces a high output blank line signal 120 for a duration of two line sync counts on circuit 95. After the two counts, the lead 123 goes high at the second bit position of the counter 47' and acts through the NAND-gate 124 to produce a low row clock signal 122. The row clock signal 122 acts through the OR gate 116 and through the AND-gates 126 to reset the blank line flip-flop 119 and the row count enable flip-flop 121. Thus, the blank line signal falls, after a duration of two widths of the line sychronization pulse cycle on lead 95. When the row clock signal 122 goes low, it increments the row counter 46 in FIG. 8f to tabulate an additional row. The purpose for holding the blank line signal 120 high for two extra counts of the line sync pulse 95 is to force two consecutive horizontal traces on the CRT screen 12 to be blank at the end of rows R6, R7 and R11 in FIGS. 3 and 4 as determined by the counter control gate system 48 in FIG. 8d. Since this is done for both the even and odd fields, a total of four rows are blank, thus providing a vertical separation between rows of text characters.

In FIG. 8f the outputs of the row counter 46 from the least significant to the most significant bits are indicated at 127 through 130. These row counts are supplied to the counter control gate system 48 in FIG. 8d where they are combined through NAND-gates, and an OR-gate as indicated to produce a blank line extension signal 131. This blank line extension signal is normally high, but goes low at rows R6,R7 and R11 in FIGS. 3 and 4 as determined by the row counter 46. When blank line extension signal 131 does go low, it closes the NAND-gates 126 associated with the text line counter 47 in FIG. 8e, thus preventing the blank line flip-flop 119 from being reset. This results in the blank line signal 120 remaining high for an additional two counts of the line sychronization pulse, thereby effectively blanking four horizontal raster scan lines between rows R6 and R7, between R7 and R8, and between R11 and R12.

Figure 3:
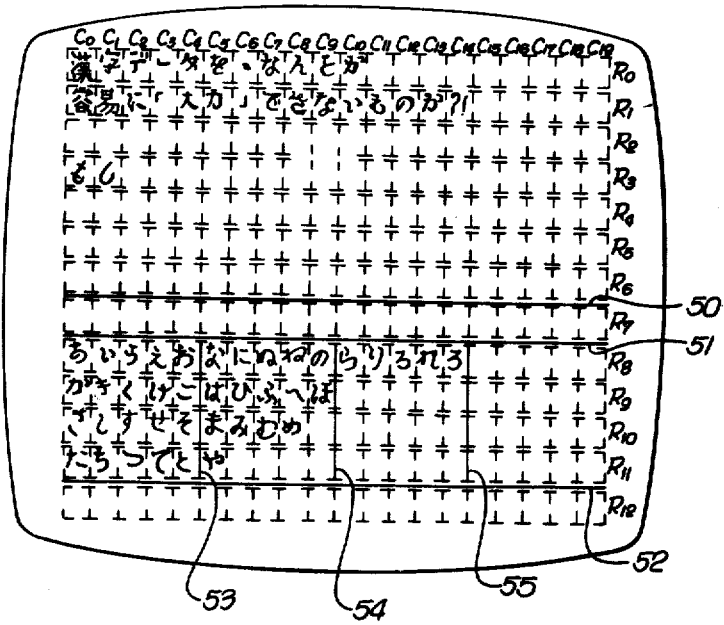
FIG. 3 illustrates the face of the cathode ray tube of the illustrated embodiment during the intermediate selection mode.
Figure 3A:
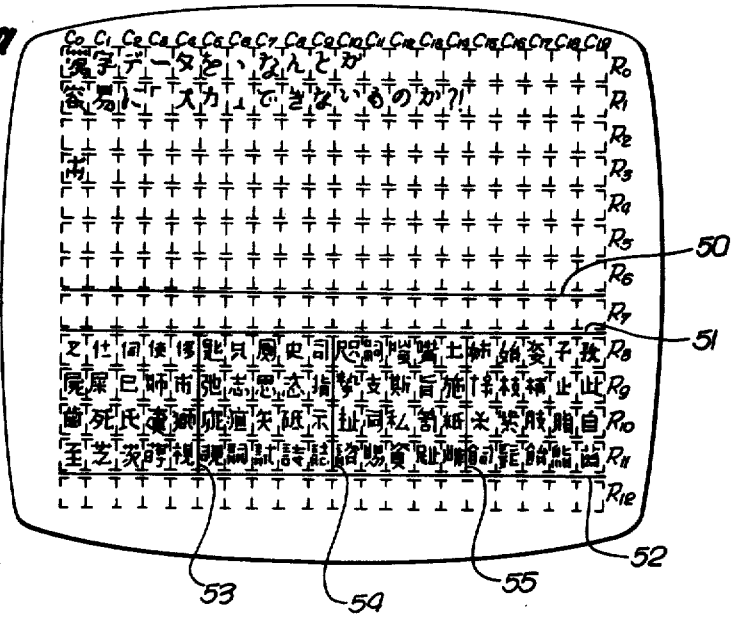

Circuitry is also provided for producing the bright traces 50, 51 and 52, also depicted in FIGS. 3 and 4. The display marker generator 49 in FIG. 8g performs a major role in this connection. The blank line extension signal 131 is passed to the data flipflop 132, which is a C-D flip-flop having one connection from the blank line extension signal 131 and another connection from the blank line signal 120. Upon receipt of a first line count signal 133 by the NAND-gate 134 from the least significant bit position of the text line counter 47, the NAND gate 134 goes low, thus activating the OR gate 135 to produce a bright line signal 136. This bright line signal 136 is transmitted to the composite video amplifier 63 in FIG. 8d and is passed through an OR-gate 137 and through a transistor network to produce a bright video output at 138 during the first horizontal trace following generation of the blank line extension signal 131. This occurs in both the even and odd fields of the video display, so that the horizontal traces 50, 51 and 52 are actually two raster lines in width.

Figure 8D:
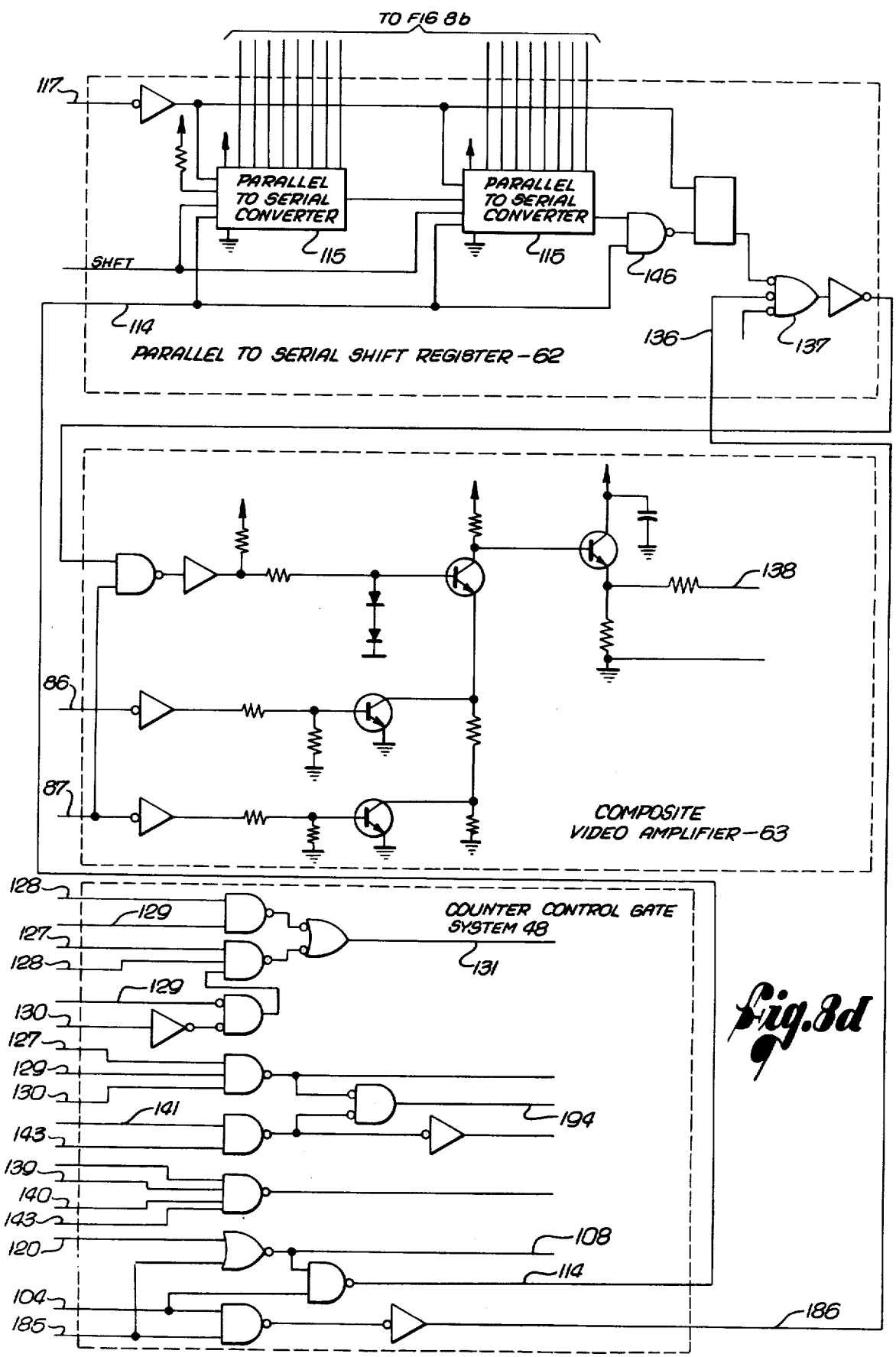
Figure 8G:
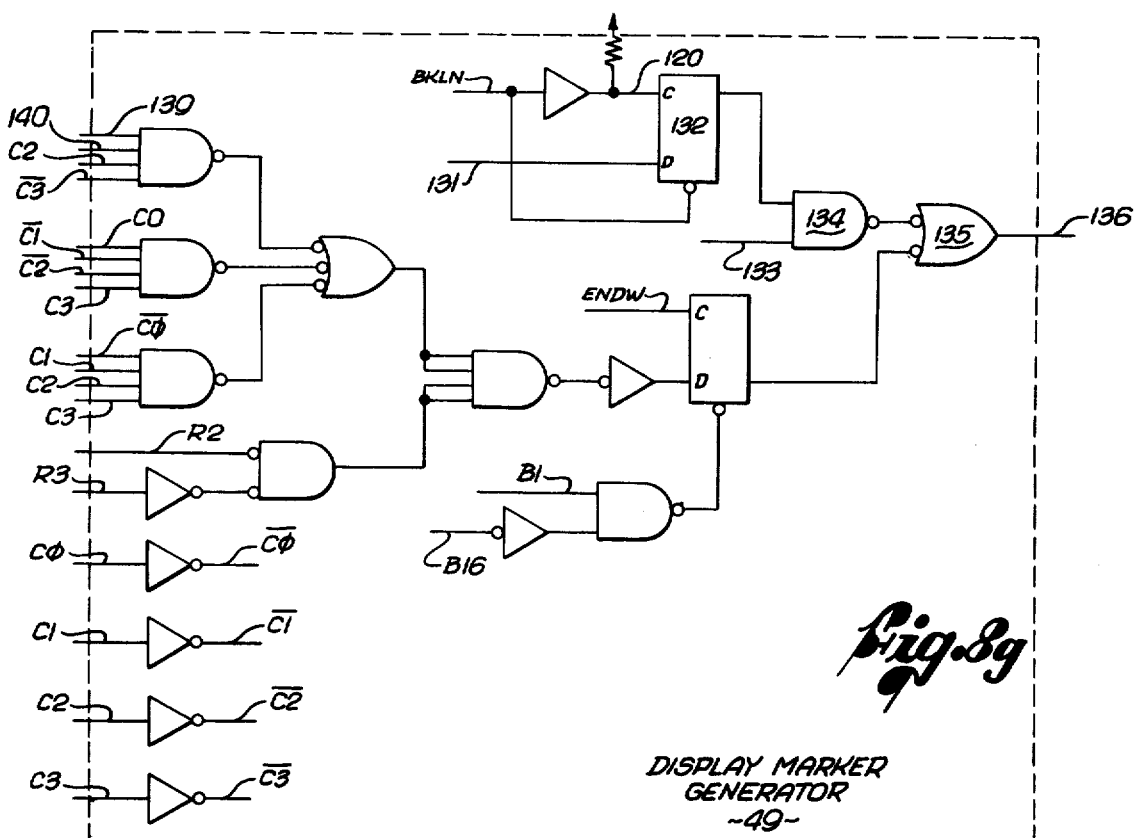

It should be noted that the display marker generator 49 in FIG. 8g is actuated to produce a bright line output 136 in a similar manner in order to create the vertical separations 53, 54 and 55 in FIG. 3 and 4. Bright spots at predetermined column locations are generated between the traces 51 and 52 by a combination of the outputs 139 through 143 of the column counter 45 in FIG. 8f and the associated J-K flip-flop circuit 144 as indicated. These outputs, and their inverted counterparts, are combined as indicated in the display marker generator 49 in FIG. 8g and are also combined with the outputs of the row counter 46 from FIG. 8f in the display marker generator 49 through the system of NAND gates, OR gates, inverters and flip-flops as indicated. Thus, between rows $R_7$ and $R_{12}$ and at the particular column locations indicated in FIGS. 3 and 4, the bright line signal 136 is momentarily activated throughout each of the horizontal traces at points in columnar alignment to produce the vertical separation lines 53, 54 and 55.

While the blank line signal 120 from text line counter 47 in FIG. 8e is high, it acts through the counter control gate system 48 in FIG. 8d to cause the strobe enable signal 108 to go low, disabling the shift out pulse 145 in the FIFO and shift control circuit 61 in FIG. 8c. The blank line signal 120 also disables the output enable signal 114, in the counter control gate system 48 in FIG. 8d thereby closing the NAND-gate 146 at the output of the parallel to serial shift register 62 to provide an interval during which data may be loaded into the parallel to serial shift register 62 from the central processing unit 10.

The central processing unit 10 provides data signals on the data bus 58, as indicated in FIGS. 6 and 6d. The central processing unit 10 strobes out the data on the bus 58 by virtue of a pulse applied to the output register 59, incidated in FIGS. 6d and 8a, on the control lead 147, which couples the central processing unit 10 to the output register 59 through the control bus 381. The signal 147 is also applied to the FIFO and shift control circuit 61 in FIG. 8c and through the circuitry of the FIFO and shift control 61 provides a shift-in pulse 148. The shift-in pulse 148 is applied to the 64 words FIFO 43 in FIG. 8b and trails the data out strobe 147 by a sufficient amount of time to allow the bit reading in the output register 59 to stablize. Thus, the shift in pulse 148 reads in the data from the output register chips 149 of the output register 59 into corresponding memory locations in the chips 150 of the 64 word FIFO 43. At the occurrence of the next line sychronization pulse 95 to the line start control 103, in FIG. 8e, the bit delay pulse 105 is transmitted to the FIFO and shift control 61 in FIG. 8c and results in a shift pulse 149 which loads the data from the 64 word FIFO 43 of FIG. 8d into the parallel to serial shift register 62 in FIG. 8d. Clock pulses at 117 clock the data out in sychronization with the output enable pulses 114 to the NAND-gate 146. The data bits are then transmitted to the OR-gate 137 and then to the composite video and amplifier 63.

The serial data output of the parallel to serial shift register 62 is mixed with the composite sync signal 86 and the composite blanking signal 87 in the composite video amplifier 63. The resultant signal produced by combining these three outputs is an EIA RS-330 standard composite video signal at 138 which is sent to the 525 line CRT display screen through a 75 ohm coaxail cable.

INTERRUPT CONTROLLER DESCRIPTION

At the beginning of each video field, a field marker flag 90 or 91 is produced by the T.V. sync generator 57 in FIG. 6c to indicate which field is being scanned, either the even field or the odd field. The flags 90 and 91 are routed to the interrupt controller 18 where an appropriate interrupt is developed for the active flag. The flagsignals 90 and 91 are transmitted to the field interrupt latch 152, illustrated in FIGS. 6d and 9f.

In the field interrupt latch 152, the flag signals 90 and 91 are combined with a signal 100, the inverse of the blank field signal 185 which is developed in the blank field ring register 70 in the video controller 15, illustrated in FIG. 8c, in response to the video sync signal 88 from the T.V. sync generator 57. The signal 100 resets the C-D flip-flops 153 and 154 in the field interrupt latch 152 in FIG. 9f following activation of those flip flops to produce field interrupt signals 155 and 156, corresponding to the odd and even fields and the field marker flag signals 90 and 91 respectively. An interrupt reset signal 157 resets the flip flops 153 and 154 and is a signal derived from the interrupt initiate control 200 to indicate that the central processor 10 is available for another request.

Figure 9C:
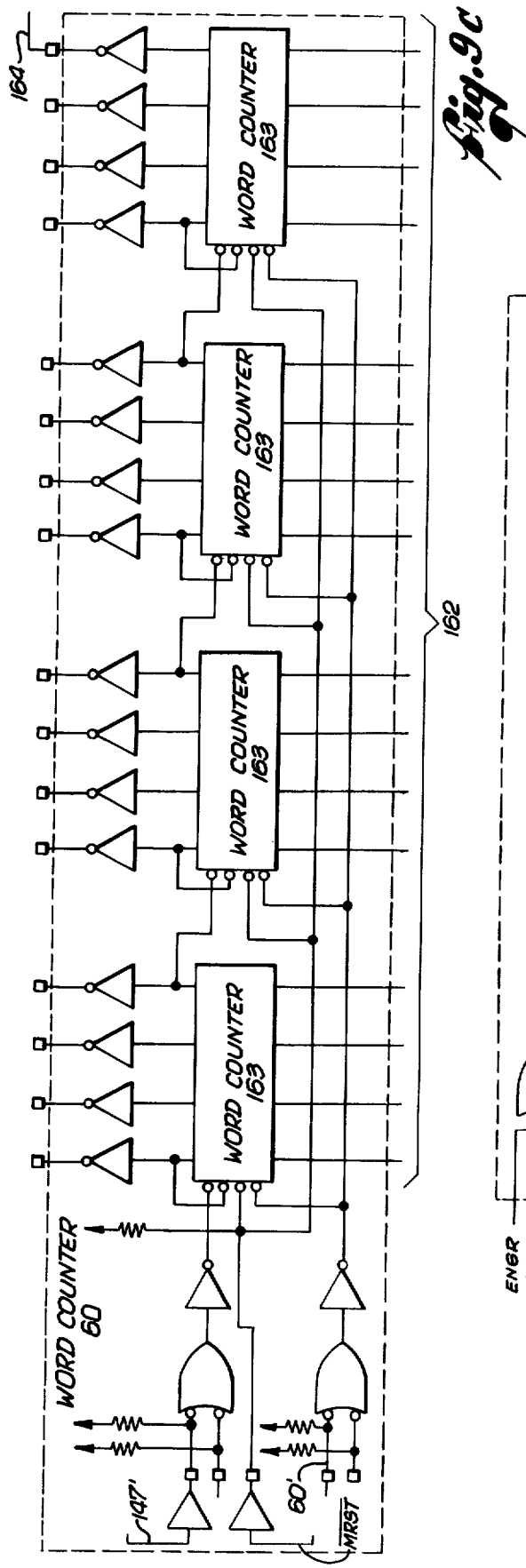
Figure 9D:
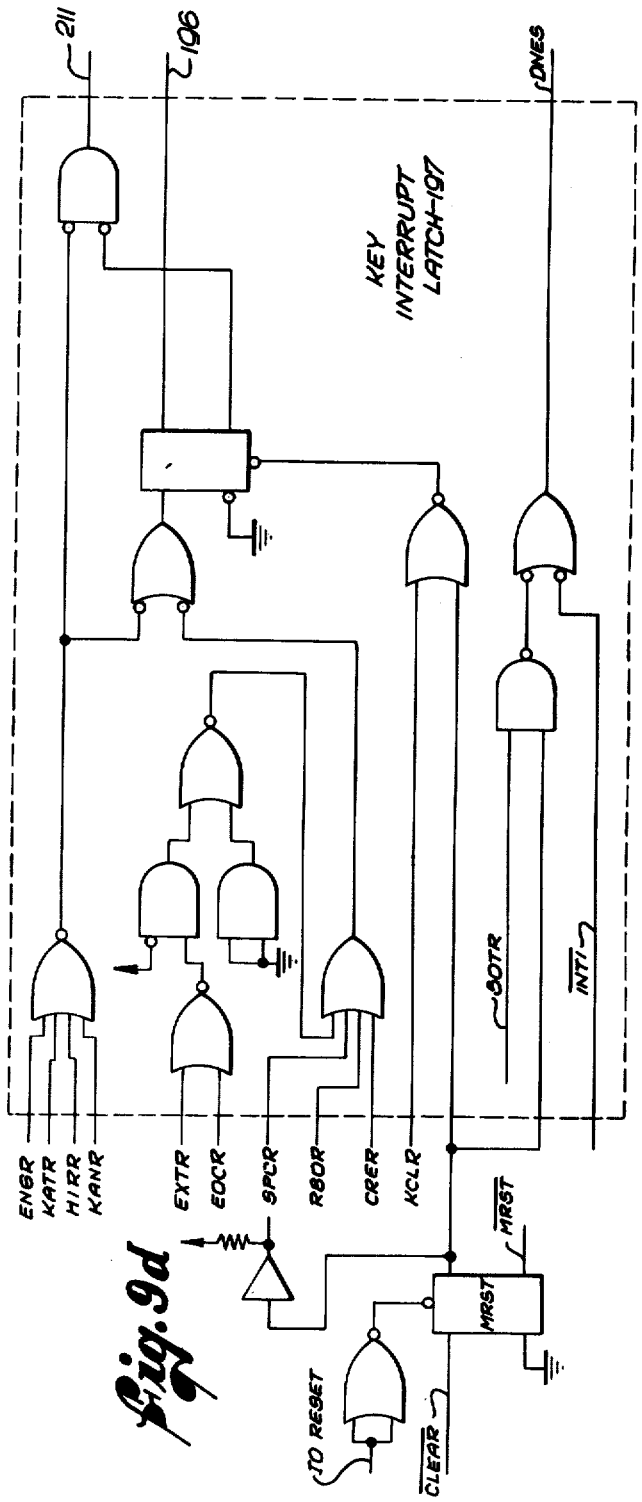
Figure 9E:
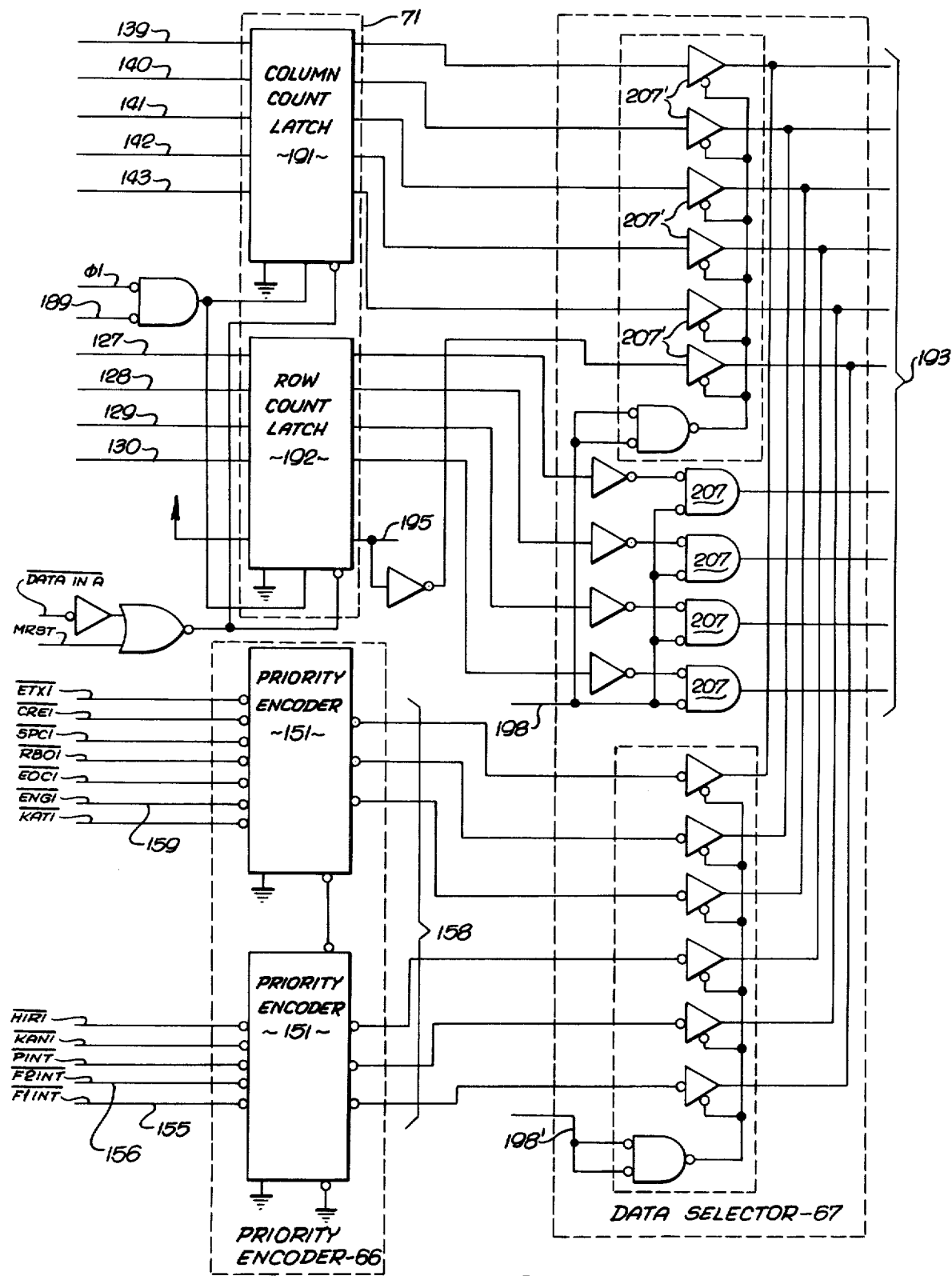

Requests to the central processor 10 are made through the priority encoder 66 illustrated in FIG. 6d and in detail in FIG. 9e. With reference to FIG. 9e, different request lines from different system components appear at the left of the 8-line to 3-line priority encoder chips 151. These different request lines are each connected to particular system components capable of initiating a data request. Access lines to the central processor are indicated collectively at the right of the priority encoder chips 151 collectively as lines 158. Proceeding from the lowermost of the request lines 155, and 156, the request lines are assembled in increasing priority. That is, the request line 155 has the greatest priority, 156 a priority subject only to line 155, etc. When a signal is received on any one of the priority request lines, it will result in a data request signal on the lines 158 and thereafter to the central processor 10 unless there is already a data request signal present at the priority encoder 66 on a data request line of greater priority. Thus, for example, if the button marked ENGL, indicating to the central processor that the English language alphabet, or Romanji, should be transferred to the central processor from the disk storage 11, a signal would be received at priority request line 159. If, however, one of the field request interrupt signals 155 or 156 were to arrive at the priority encoded 66, the signals on lines 158 would respond to the video display refresh request on line 156 or 155 for display information in the indicated field, as the display request 155 and 156 have greater priority than any other request signal. The signal on line 159 would then be held in abeyance until the display refresh request on line 155 or 156 had been satisfied.

The display refresh request 155 and 156 cause the central processor access line 158 to initiate a subroutine in the central processor program that causes the central processor to provide the initial address in the block of memory devoted to display refresh information for the particular field, even or odd, for which display refresh information is requested. The starting address of the area of core memory containing the data for display refresh for the field requested is strobed into the address counter 160 in FIG. 9b on the data input lines indicated collectively as 161. The strobing pulse that causes the entry of the data on lines 161 is a data out A pulse 85 that is transmitted from the central processor 10 to the address counter 160. Next, the two's complement of the number of words to be transferred, the word count of the display refresh information, is transmitted into the word counter 60 in FIG. 9c on data input lines indicated collectively at 162. A pulse 60' termed data out B is the enabling pulse in this regard which strobes the data into the word counter 60. The word counter 60 is comprised of four serially connected four bit counter chips 163. Thus, at this time the address counter 160 contains the starting address for the display refresh information while the word counter 60 contains the number of words in that display refresh block.

Once the word count has been entered into the word counter 60, the word count output flag 164 from the word counter 60 goes low. The word count flag 164 is applied to the FIFO and shift register control 61 in the video controller 15 in FIG. 8c and resets the flip flop 165 in the FIFO and shift register control 61. This resets the output 166 of the flip flop 165 to a low condition, thus driving the signal 167 low. The signal 167 is maintained in a low state until the entire data transfer has been completed in refreshing the display information. If the input ready signals 168 through 171 from the Fifo buffer 43 in FIG. 8a to the FIFO and shift register control 61 are all low, they are combined together with the word count output signal 164 to produce an output to reset the shift-in flipflop 172, thereby allowing a shift-in pulse at 148 to be developed in response to a data channel output selection pulse 147 from the central processor 10.

The signal at 167 is transmitted to the data channel request control 173 in FIG. 9i which causes the data channel sychronization flip flop 174 to request the central processor 10 for data. This request occurs on the leading edge of the data channel request enable signal 177 from the processor. The data channel request signal 175 to the central processor 10 causes the processor 10 at the next opportunity at which the processor is able to respond, to transmit a data channel address signal 176 to the data channel request control 173. This signal is developed into an address enable signal 178 which is fed to the address counter 160 in FIG. 9b. The address enable signal 178 is used to strobe the contents of the address counter 160 onto the data bus at the lines indicated collectively at 58. In response to the signals at 58, the central processor 10 places the data word located at the address indicated on the data bus and produces a data out strobe 180 directed to the data channel request control 173 in FIG. 8i. The resultant pulse 147, previously discussed, is used to strobe the data word from the central processor 10 onto the data channel leads 58 to the output register 59 in FIG. 8.

The data channel output pulse 147 is also applied to the FIFO and shift control register 61 in FIG. 8e and causes the shiftin pulse 148 that is developed to immediately load the contents of the output register 59 in FIG. 8a into the 64 word FIFO 43 in FIG. 8b. The data channel output pulse 147 increments the contents of the address counter 160, in FIG. 9b while the complement, the pulse 147', increments the word counter 60 in FIG. 9c when the pulse 147 has gone low bringing pulse 147' high. This process will be repeated until the number of words originally placed in the word counter 60 have been transferred, at which time all of the display refresh information will have been transmitted to the CRT 12. The FIFO buffer 43 serves to allow retiming of the data into sychronism with the display of the CRT 12. It should be noted that once the word counter 60 has been counted up to zero, the word counter output signal 164 goes high thereby terminating the cycle of data transmission in response to the field display refresh request, since the request has at that time been satisfied.

Figure 9F:
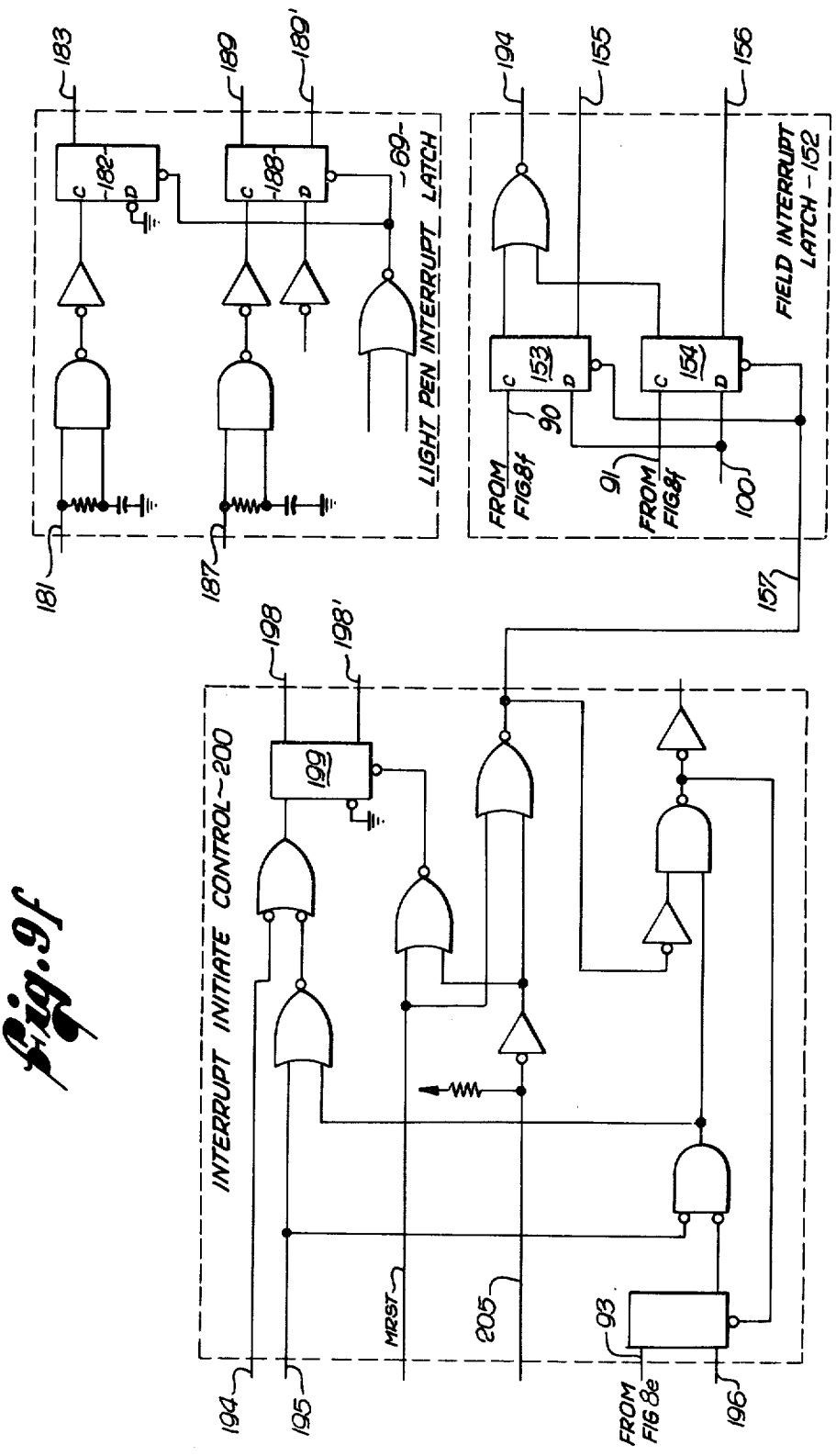

The circuitry associated with the use of the light pen 17 to select a character from the language character font display 14 on the CRT 12 in FIG. 1 also acts through the interrupt controller 18. Referring to FIGS. 1, 6 and 9f, when an operator at the console of FIG. 1 places the light pen 17 to the language character font display portion 14 of the screen of the CRT 12, and touches the activating switch of the light pen 17, a light pen enable signal 181 is generated and is transmitted to the light pen interrupt latch 69 in FIGS. 6c and 9f. This latches the light pen data interrupt flip flop 182 to produce a continuous pen enabling signal 183 as an output. The pen enabling signal 183 is transmitted to the blank field ring register 70 in the video controller 15 in FIG. 8c which causes the four bit shift register 184 of the blank field ring register 70 to be loaded with the binary "001" and to circulate data generating recurrent blank field pulses 185. The blank field pulses 185 are applied to the counter control gate system 48 in FIG. 8d and cause the output enable signal 114 to blank every third data field. The blank field pulses 185 also cause a trace enable signal 186 to create a white trace on the display screen during the blanked fields. The trace enable system 186 is one of the inputs to the composite video amplifier 63.

When the light pen 17 is actually illuminated by one of the trace lines, the light pen emits a light pen read pulse 187 which is transmitted to the light pen interrupt latch 69 in FIG. 9f to latch the pen read flip flop 188 in an active state. This causes the pen read signal 189 to be high while the complementary signal 189' is low. The pen read signal 189 is connected to the blank field ring register 70 in FIG. 8c and causes the ring register 70 to be reset by resetting the flip flop 190. This terminates the blank field signals 185 and the resultant trace enable signals 186 from the counter control gate system 48 in FIG. 8d.

The pen read signal 189, when generated, in the light pen interrupt latch 69 in FIG. 9f, is transmitted to the R-C data latch 71 in FIG. 9e. This data latch includes a column count latch 191 and row count latch 192. The column count latch receives the outputs 139 through 143 from the column counter 45 in FIG. 8f indicative of the column position of the white trace on the screen of the CRT 12. Similarly, the row count latch 192 receives the output signals 127 through 130 of the row counter 46 to indicate the row position of the trace signal on the CRT 12. Together, the contents of the column count latch 191 and row count latch 192 indicate the coordinate position on the face of the screen of the CRT 12 of the electron beam at any particular instant. At the instant that the pen read signal 189 from the light pen interrupt latch in FIG. 9f is received by the R-C data latch 71, in FIG. 9e those coordinate positions are locked into the count latches and are transmitted as inputs to the data selector 67, and ultimately to the central processor 10 as identification signals indicated collectively on the ID output bus 193 from the data selector 67. Thus, the central processor 10 is advised of the coordinate position at which the light pen 17 was located when the pen read signal 189 was generated, thereby defining the particular language character in the language character font display area 14 which was selected to be read into text.

Synchronization is maintained between the light pen signals and the column counter 45 and row counter 46 since when the row counter 46 reaches a count of 13 and the column counter 45 reaches a count of 20, the outputs thereof applied to the counter control gate system 48 in FIG. 8d will generate an end of field pulse 194. The end of field pulse 194 is applied to the field enable control 92 in FIG. 8e resetting it and disabling the video controller circuitry until the T.V. sync generator 57 provides the next vertical sync pulse 88.

The actual entry of the column and row count information from the column count latch 191 and row count latch 192 in FIG. 9e are but a part of the information entry sequence of the interrupt controller 18 when the interrupt controller is responding to a pen interrupt signal. When any type of interrupt signal occurs, whether it is a field interrupt signal 194 from the field interrupt latch 152 in FIG. 9f, whether it is a pen interrupt signal 195 developed from the row count latch 192 in FIG. 9e, or whether it is a key interrupt signal 196 derived from the key interrupt latch 197, in FIG. 9d, hereinafter to be described, an interrupt signal 198 and its complement 198', are developed in the interrupt initiate gate 199 in the interrupt initiate control 200 in FIG. 9f. When the gate 199 is active, the interrupt signal 198 and the inverse signal 198' cause the data selector 67 in FIG. 9e to place the word that is present at the outputs 158 of the priority encoder 66 onto outputs in the data selector output bank ID bus 193. In addition, the interrupt signal 198' from FIG. 9f is transmitted to the interrupt request control 68 in FIG. 9h which will develop a flag signal 201 derived from the output of the C-D flip flop 202. If there are no other interrupts of a higher priority active on the interrupt priority line to the processor 10 on the control bus 381, the next request enable signal 177 in FIG. 9h from the central processor 10 will set the interrupt request flag 203. The central processor 10 will respond to the interrupt request flag 203 with a program controlled interrupt acknowledge signal 204 to the interrupt request control 68. From the interrupt acknowledge signal 204 an interrupt acknowledge pulse 205 is derived to strobe the ID bus 193 in the data selector 67 in FIG. 9e to cause the contents on the leads of the ID bus 193 to be strobed into the input register 206 in FIG. 9a. The interrupt acknowledge pulse 205 also opens the output gates of the input register 206 to apply the contents of the input register 206 to the data bus 58. The central processor 10 will receive this data word from the input register 206 and poll it programmatically to determine the service to be rendered.

The interrupt signals 198 and 198' influence the sequence by which data is transferred from the ID bus 193 in FIG. 9e to the input register 206. Upon receipt of the interrupt pulse 198' by the data selector 67, the outputs from the priority encoder 66 are gated to the leads indicated in FIG. 9 of the ID bus 193. Concurrently, the appearance of the interrupt pulse 198 disables the outputs of the AND-gates 207 and the controlled inverters 207'.

The interrupt acknowledge pulse 205, in addition to its other functions, also clears the interrupt initiate gate 199 in FIG. 9f. As it does so, the trailing edge of the interrupt pulse 198' acts on the data selector 67 in FIG. 9e and strobes the contents of the ID bus 193, which remain on the ID leads momentarily, to the input register 206 in FIG. 9a.

When the central processor 10 samples the outputs of the input register 206 in FIG. 9a during the gating period established by the interrupt acknowledge pulse 205, it will ascertain whether or not the interrupt was caused by operation of the light pen 17. If this is the case, the central processor 10 will require further information, specifically the location of the light pen when it was actuated. This information, as previously discussed, is provided by the column count latch 191 and the row count latch 192 of R-C data latch 71 in FIG. 9e. The output of this information to the central processor 10 is controlled by a start pulse 208 to the input register 206 in FIG. 9a which is generated by the central processor 10 and is indicative of a pen interrupt signal. The start pulse 208 strobes the input register 206 to again cause it to accept data from the ID bus 193. At this point in time, however, the interrupt pulses 198 and 198' have ceased, thereby unblocking the outputs of the column counter latch 191 and row count latch 192 in FIG. 9e to allow these outputs to pass through the data selector 67 to the ID bus 193, and on to the input register 206, the central processor 10 than produces a Data-in A pulse which places the contents of the input register on the Data Bus 58 for reception by the central processor 10. The central processor 10 is thereby able to sample the outputs of the column count latch 191 and row count latch 192 from the input register 206, after it has sampled the outputs of priority encoder 66 in the case of a light pen interrupt signal.

To generate a key interrupt signal, the operator of the console of FIG. 1 selects and depresses one of the key switches in the function keyboard 16, indicated in FIG. 1 and FIG. 9h. The selection of any key switch by the operator causes a respective bit to be transmitted to the line reciever 209 in FIG. 9g. The output of the line receiver 209 is latched into the mode latch 65. The data in the mode latch 65 is applied to the key interrupt latch 197 in FIG. 9d and to the priority encoder 66 in FIG. 9e to indicate a request for servicing by the central processor 10. The application of the output of the mode latch 65 to the key interrupt latch 197 causes the key ready enable signal 196 to go high and to be applied to the interrupt initiate control 200 in FIG. 9f. At the end of the current display field, the rising edge of the field enable signal 93 to the interrupt initiate control 200 in FIG. 9f from the field enable control 92 of FIG. 8e will cause the interrupt initiate gate 199 to become active. Thus, the interrupt signals 198 and 198' will be developed as previously described.

If the selected key function in the keyboard 16 of FIG. 9h was English (ENGL), Katakana (KATR), Hiragana (HIRR) Kanji (KANR) or start (SOTR), the key interrupt latch 197 of FIG. 9d will cause the lamp set up signal 211 to go high latching an appropriate bit into the mode indicator latch 212 of FIG. 9g. The mode indicator 212 will then drive one of the lamps 213 associated with the selected key switch and will cause a light to appear behind that selected key switch, thereby illuminating it in the function keyboard 16. Thus, depression of one of the keyboard switches on the function keyboard 16, in FIG. 9h for example the switch ENGL, will result in the appearance of a signal at 159 from the mode latch 65 of FIG. 9g to the priority encoder 66. When this signal 159 is not superceded by any interrupt requests of greater priority, the outputs 158 in FIG. 9e to the central processor 10 defines a data word which will call the English language alphabet from the disk storage 11 and cause the alphabet to be stored in the central processor 10 in the core area devoted to storage of the the language character font display 14 of the CRT 12. Also, the signals 213 from the mode indicating latch 212 in FIG. 9g illuminate the appropriate key switch in the keyboard 16 so that the keyboard operator is aware of the mode of operation of the device.

OPTICAL DIGITIZER DESCRIPTION

As previously indicated, it is frequently desirable, in connection with language character forms having a multiplicity of characters, to provide a means for manually inputting characters not already stored in the library of the complex character form. An optical digitizer 20 is provided for this purpose, the physical aspects of which have been discussed in connection with the inputting of a previously untabulated Kanji character into the lexicon of the central processor 10. If, when in the Kanji mode, the operator determines that the character desired for display is not resident in the Kanji library, the desired character is merely hand written on a card 30 provided for this purpose and placed in the slot indicated in FIG. 13 in the optical encoder 20. The character is then digitized in a 32 by 32 dot matrix of Reticon video photosensor elements arranged in an array 40 when the operator places a card 30 in the optical encoder 20 of FIG. 13 as illustrated. The operator then depresses a read button on the function keyboard 16.

Figure 12A:
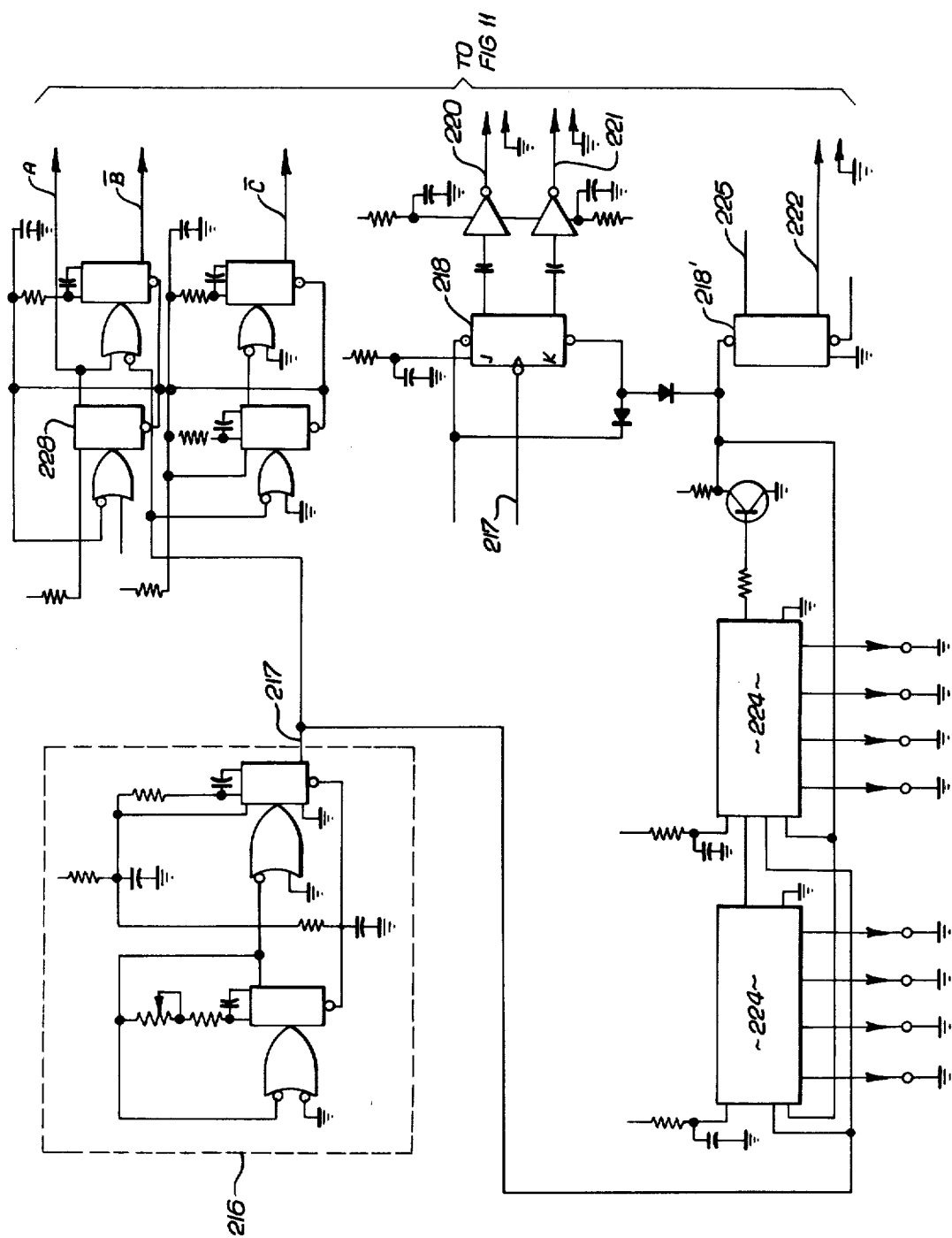

The electrical elements of the optical encoder 20 are illustrated in FIGS. 11, 12a and 12b include a timing generator depicted in FIG. 12a. The timing generator includes a single shot 216 clock that runs at about 500 KC. The output of the clock 216 is a signal 217 that drives dual flip flops 218 and 218' one of which in turn drives a MOS driver chip 219 to provide phased outputs 220 and 221 that are transmitted to the photosensor array 40 in FIG. 11. In addition, the same flip flop 218 that provides the output signals 220 and 221 also provides a synchronous clock signal 222 that is transmitted to the line driver 223 in FIG. 12b to perform timing functions. The timing generator 215 of FIG. 12a also includes two counter chips 224 connected to emit an output pulse for every 35 input pulses. The output pulses act through flip flop 218' to provide a start pulse 225 to start each line of scanning in the photosensor array 40. The reason for this requirement is that the photosensor array 40 has 32 diodes in a scanning line and requires a scan time equivalent to three diodes for retracing.

The signal 217 also develops other timing pulses through a series of one shot circuits 228 which are necessary to run the charge amp intergrator and sample and hold circuit 226.

The photosensor array 40 depicted in FIG. 11 is scanned one diode at a time in a retracing raster tracing a series of lateral lines of diodes in a rectilinear matrix. The output 229 of the photosensor array 40 is a very small current which acts as an input to a charging amplifier 230. The charging amplifier 230 is an operational amplifier having a very high gain and which receives an automatic gain control signal 231 from another operational amplifier 232 to keep the range of the charge amplifier 230 within limits. The output of the amplifier 230 is a voltage pulse that corresponds to the amplitude of the current charge pulse of the signal 229 from the photodiode array 40. The amplifier 230 thereby acts principally as a current to voltage transducer. The voltage pulse from the amplifier 230 represents the charge pulse that was stored in the photodiode most recently sampled.

Figure 10A:
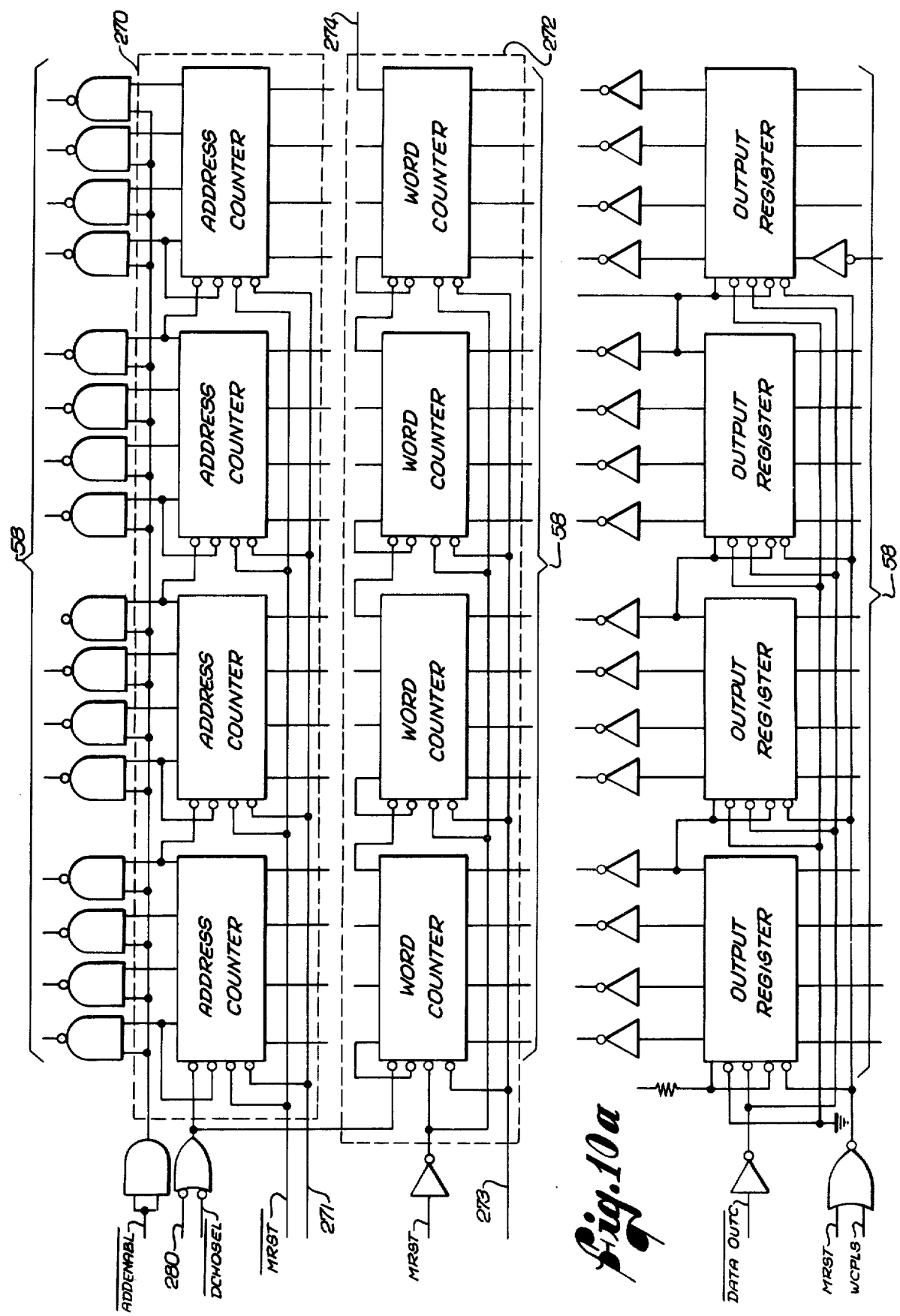
Figure 10B:
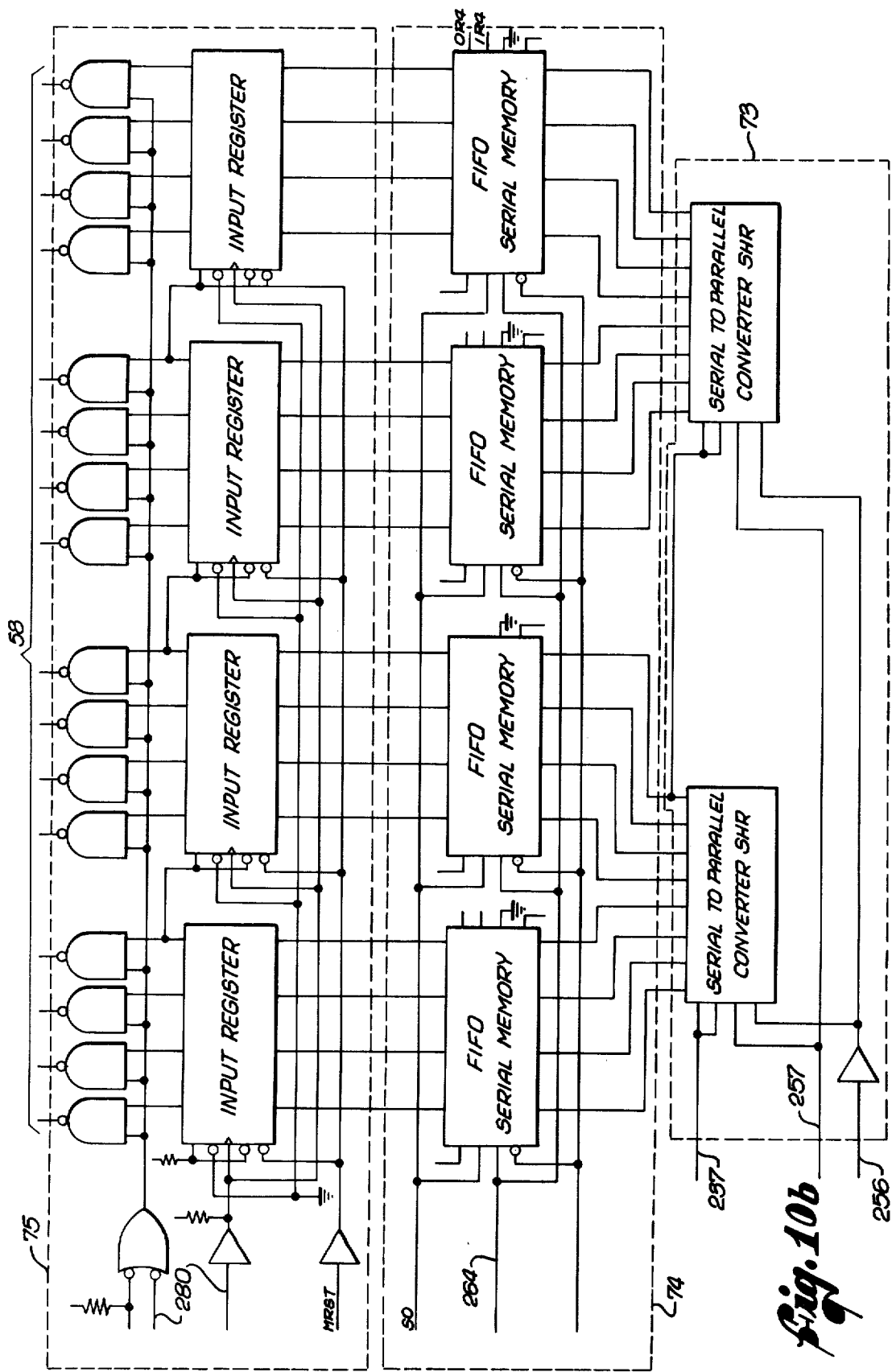

The output of the amplifier 230 is passed to a resetable integrator 254 which is a programable operational amplifier circuit. Integration occurs at a capacitor 233 the contents of which are sampled, after appropriate settling time, and integrated in a sample and hold circuit 227 at another capacitor 255. The output of capacitor 233 is generally in a sawtooth waveform with sampling occuring in the intermediate portion of the downward slope. The charge on the capacitor 255 is stored until an appropriate timing function from the one-shots 228 of FIG. 12a transmits the signal from capacitor 255 through the sample and hold circuit 227 as a squarewave pulse to a threshold detector circuit 72 in FIG. 12b. This input to the threshold detector circuit 72 represents the current charge on the photodiode from which the signal was derived. The threshold detector 72 in FIG. 12b includes a high gain operation amplifier 235 which emits either a zero or one output depending upon whether the signal from the sample and hold circuit 227 achieved a predetermined threshold amplitude. Thus the output of amplifier 235 is a series of data bits which are provided to a line driver circuit 236 for transmission to the optical digitizer controller 21 illustrated in FIGS. 10a–10d. However, the data bits from the line driver 236 which appear at 237 in FIG. 10b are not necessarily processed because the data produced is only valid after the lamp 37 in FIGS. 12b and 13 has been lit for a period of time sufficient to come up to full brilliance.

To initiate a card reading operation, the operator must press the READ button 239 in the function keyboard 16 in FIG. 12b. The READ button 239 activates a debouncing flip flop circuit 240 which generates a trigger output at 241 which in turn provides a signal to the lamp drive control 247. The lamp drive control 247 includes a timer 245 which is activated by the trigger pulse 241 to initiate an output at 244 for approximately 150 milliseconds. This output is inverted and appears at 243 as a signal which serves as a lockout to one of the inputs of the NAND gate 248 for the duration of the output of the timer 245. The signal 243 also fires another timer 249 which emits a signal at 248 that performs two functions. The signal 248 turns on the lamp 37 and also enables one of the inputs to the NAND-gate 248. Assuming that power is on to the other input of the NAND-gate 248, the NAND-gate 248 will be opened once the signal 243 has disappeared, thereby enabling the final input thereto. However, the lockout signal 243 will temporarily prevent activation of the NAND-gate 248 for the 150 millisecond period of the timer 245, which is a sufficient time for the lamp 37 to achieve full brilliance.

Once the NAND-gate 248 produces an output, it enables a flip flop 253 which in turn responds to an end of field pulse at 254 is derived from the photosensor array 40. The end of field pulse is a signal that occurs throughout the duration of the last line of scanning of the photodiode array. Coincident with the trailing edge end of field signal 254 the output of the flip flop 253 goes high, is inverted and appears as a frame signal 256 indicating that a valid frame of data is being scanned. This frame signal 256 is necessary before the data pulses at 237 will be recognized by the optical digitizer controller 21.

In addition to the frame pulse 256, shift pulses 257 are also necessary for the data pulses 237 to be processed. The shift pulses 257 are derived from the clock signal 217 acting at the input of a pair of series connected one-shots to introduce a slight delay into the timing. In addition, an end of line signal 258 is produced by the photodiode array at the conclusion of scanning each line and during retracing of the photosensor scanner. The end of line signal 258 acts as a reset to a flip flop 259 which is otherwise activated in response to the clock pulses 222 to produce a series of shift pulses at 257. Thus, the shift pulses at 257 appear in correspondence with each photodiode in the array 40. The shift pulses are suppressed at the end of each scanning line for the three diode retrace time required by virtue of the end of line pulse 258.

The data pulses 237, the frame pulses 256 and the shift pulses 257 are the only signals that are passed from the optical digitizer 20 located at the operator position indicated in FIG. 1 to the optical digitizer controller 21 located within the console. Transmission from the optical digitizer 20 to the optical digitizer 21 is over a low voltage cable.

The functions of the optical digitizer controller 21 are to reformat the incoming serial data pulses 237 into sixty four 16 bit words for parallel data block transfer to central processor 10. The optical digitizer controller 21 also conditions the data channel 58 to effect the transfer and to effectuate a transition from asychronous to sychronous retiming of the input data pulses 237.

The details of the electronic circuitry of the optical digitizer controller 21 are illustrated in FIGS. 10a–10d. When the frame signal 256 of FIG. 12b is provided to the controller 21, the frame counter 260, in FIG. 10c, comprised of three series connected counter chips 261, is enabled. The frame counter 260 will then count the 1,024 shift pulses as they are provided at 257. As each group of 16 shift pulses are counted, a signal at 262 is generated and passed to the FIFO control 263 which produces a shift-in pulse at 264 to load one parallel 16 bit word into the FIFO buffer 74 of FIG. 10b from the serial to parallel shift register 73. The shift register 73 is comprised of two eight bit parallel out serial shift register chips clocked by the shift pulses 257 from the optical encoder 20 and cleared by the disappearance of the frame pulse 256. When the contents of the chips 265 has been cleared by the absence of the frame pulse 256, the shift register 73 contains all zeros. Immediately following the last data word, this 16 bit word of all zeros is processed as if it were part of the output of the optical encoder 20 and is treated as a flag within the central processor 10 to identify the immediately proceeding stored data as being a completed output of the optical encoder 20.

The 64 word FIFO buffer 74 is comprised of four identical 64 by 4 bit memory chips, the contents of which are advanced forward upon receipt of the shift in pulses 264. Sixty four consecutive words will be loaded from the shift register 73 to the FIFO buffer 74 thereby filling the FIFO buffer. As the shift pulses are received at 257 by the frame counter 260, in FIG. 10c, every sixteenth pulse creates a signal 262 generating a shift-in pulse 264 as previously explained. When the frame counter has counted 1,024 shift pulses at 257, it will be in a locked condition with output 265 in an active state. This output 265 is applied to the interrupt request control 380 in FIG. 10d to activate a flip flop 266 indicating that the loading operation of the buffer has been completed and that the optical digitizer controller 21 is ready to transmit information to the central processor 10. Actuation of the flip flop 266 will produce an interrupt request signal 267 at the occurence of the next request enable signal 177 from the central processor 10. The central processor responds to the interrupt request at 267 by providing an interrupt acknowledge signal 268 to the interrupt request control 380. Since some identification of the information to be supplied must be provided to the central processor 10, the interrupt acknowledgement signal 268 issued to trigger a gating array, the outputs of which are supplied in the last six positions in the data channel lines 193 of the data bus 58, thereby indicating to the central processor 10 that the information to be transmitted is from the optical digitizer controller 21. Upon recognition of the code signals from lines 193, the central processor 10 transfers the starting address of the block of core to be filled by the information to be transferred into the address counter 270 of the optical digitizer controller 21 with a data-out A signal at 271 in FIG. 10a. Also, the central processor 10 provides a transfer word count which it strobes into the word counter 272 with a data-out Bsignal 273. This word count is a count of negative 65, so as to include all of the 64 words from the photosensor array 40 as well as the final identification word of all zeros previously discussed.

Figure 10C:
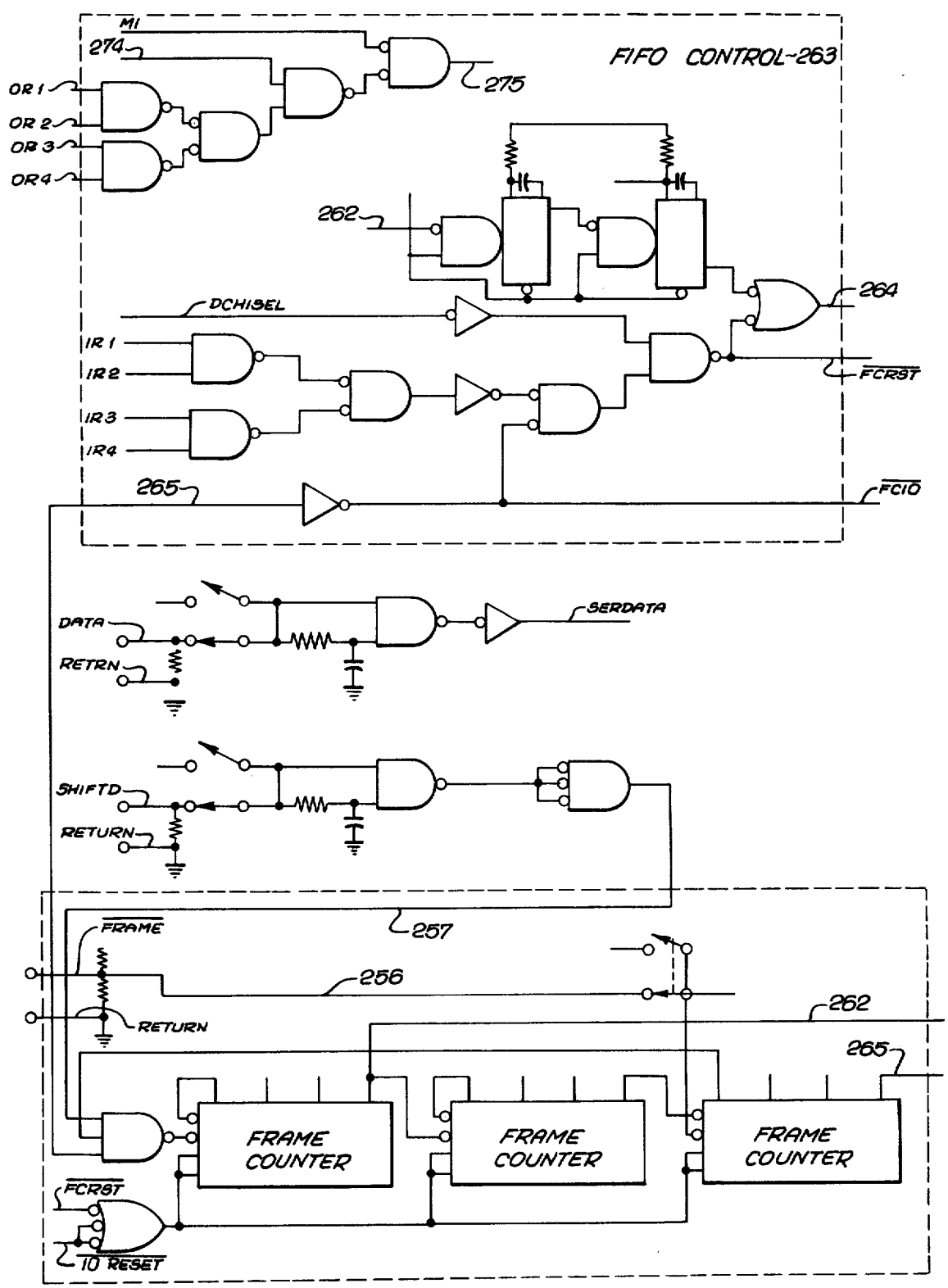

Upon receipt of the word count, the word counter output signal 274 goes high enabling the FIFO control 263 in FIG. 10c to request the data bus 58 from the central processor 10. The FIFO control 263 makes this request by transmitting a signal at 275 to the data channel request control 276 in FIG. 10d. The input at 275 initiates a data channel request signal 277 upon the occurence of the next request enable signal 177 from the central processor 10. The central processor 10 responds by providing a data channel request acknowledgement signal 278 which is reformed into an address enable signal 279 in the data channel request control circuit 276. The address counter enable signal 279 strobes the address of the memory storage location in which a word is to be stored onto the data bus 58 and strobes the contents of the last cell of the FIFO buffer 74 in FIG. 10b into the input register 75. A data advancing pulse 280 from the central processor 10 then places the data in the input register 75 onto the data bus 58, and at the trailing edge of the pulses at 280, the address counter 270 and the word counter 272 in FIG. 10a are incremented in preparation for the next word transfer.

After the last data word is transferred from the serial to parallel shift register 73 in FIG. 10b into the FIFO buffer 74, the FIFO control 263 of FIG. 10c will generate one more shift-in pulse at 264 to load a word of all zeros from the serial to parallel shift register 73 into the 65th word position. The data channel transfer actually takes 65 words, the 65th word setting a flag register in the core memory of the central processor 10 to zero. The operating system in the central processor 10 periodically checks this register to determine when the transfer is completed.

OPERATION OF THE INVENTION

The apparatus of the embodiment disclosed may be utilized in several different ways. In a simple application of invention, for example in a simple transposition from Japanese written in Romanji or English language characters to Hiragana characters, a Romanji character copy of material to be translated into Japanese might be presented for transposition. If the material to appear in the row $R_3$ of the CRT display in FIG. 3 were to be in the Hiragana language character form, the operator would depress the Hiragana button on the function keyboard 16 to transfer in all of the Hiragana characters to be utilized from the disk storage 11 of FIG. 5 to storage in the central processor 10 in the portion of memory reserved for the characters of the language character system in which the text is to appear. The other language character fonts would at this time be maintained only in the disk storage 11. Together the disk storage 11 and central processor 10 maintain representations of characters from each of the Romanji, Katakana, Hiragana and Kanji language forms, but only the language character form from which current selections are to be made is transferred from disk storage 11 to the central processor 10.

Upon transfer, the Hiragana character font will appear in the character font display section 14 of the CRT 12, for example as depicted in rows $R_8$ through $R_{11}$ in FIG. 3. These character images would be continually refreshed by the operation of the video controller 15 which automatically directs display refresh requests through the interrupt controller 18 to the central processor 10. In turn, the central processor 10 is coupled to the CRT 12 through the video controller 15 to temporarily display the images of the Hiragana language characters from which the text characters are to be selected in the ordered language character format depicted in FIG. 3.

To select a Hiragana character, the operator would utilize the light pen 17 and direct it to a particular character image in the Hiragana language character font display of FIG. 3. For example, if the Romanji text material to be tranposed into the Hiragana language character form were the syllable "mo" the operator would direct the light pen to the equilavent Hiragana character located in row $R_{10}$ and at column $C_9$ in FIG. 3. That character, the Hiragana form of the syllable "mo" would then be reproduced in the next sequential location of text material in the text display area 13 of the CRT 12, for example, if the CR button (carriage return) of the function 16 were depressed twice following the material theretofore selected as text characters, and the character at row $R_{10}$, column $C_9$ of FIG. 3 were to be chosen as the next sequential text character, a representation of the character at row $R_{10}$, column $C_9$ would be displayed also at row $R_3$, column $C_0$, after a momentary blanking of the CRT screen.

That operation complete, the operator would then again activate the light pen for the next character to sequentially appear in the text. For example, the next Romanji syllable might be the syllable "shi". The operator would then move the light pen 17 to the character located at row $R_{10}$, column 2 in the character font display area 14 in FIG. 3 and again activate the light pen switch. The screen of the CRT 12 including both the text display 13 and the language character font display 14 would then be blanked momentarily, as previously described. Following unblanking, the Hiragana character corresponding to the syllable "shi" would appear in row $R_0$, $C_1$ in the next display area 13 of the screen of the CRT 12, as illustrated in FIG. 3. Having completed transposition of the word "moshi" (a greeting one normally repeats twice upon answering the telephone), the operator might wish for a blank space to appear in the text display area 13 at row $R_3$, column $C_2$. This is achieved by pressing the SPACE button on the function keyboard 16. Transpositioning is continued in this matter until the text material is complete or the text display area 13 has been filled. Upon the occurrence of either event, a hard copy output of the displayed text created may be obtained from the plotter/printer 19 by depressing the end of text (ETX) key in the function keyboard 16.

While the foregoing utilization of the apparatus of the invention reflects a rudimentary application of the device to a transposing task, the invention finds its greatest utility in transposing to language character forms having a great multiplicity of characters. This is achieved by utilizing light pen 17 both in an intermediate selection mode and in a final selection mode. Thus, to effectuate transposing a Romanji character into Kanji, one would initially perform the operations previously indicated in connection with transposing into the Hiragana language character form. However, instead of depressing Hiragana button in the function keyboard 16, the operator would instead depress the KANR button. This introduces a mode selection function into the device so that the initial selection of a Hiragana character does not result in that character being stored at the next sequential text storage location in the central processor 10 and displayed correspondingly on the CRT 12 in the text display area 13. Rather, selection of a Hiragana character followed by depression of the end of character button (EOC) on the keyboard 16 would result in a mementary blanking of the screen as before, but instead of producing an image in the next sequential character location, the central processor would replace the Hiragana language character font display in the character font display area 13 of the CRT 12 with selected Kanji characters from which the next sequential text character is to be selected, thus changing the mode of operation from intermediate to final selection. The result, if the Hiragana character corresponding to the Romanji syllable "shi" were selected, would be the display depicted in rows $R_8$ through $R_{11}$ in FIG. 4. The 80 different Kanji characters depicted in the language character font display area in FIG. 4 all correspond to the Hiragana character in turn corresponding to the Romanji syllable "shi". From these Kanji characters, the operator would select a single character image for reproduction in the next sequential text character location by moving the light pen adjacent thereto and depressing the activation switch. The operator could, for example, select the Kanji character appearing at row $R_9$, column $C_4$ of FIG. 4. The central processor 10 would recognize this final selection and would reproduce that character in the next sequential text character location, for example at the location in row R3 and column $C_0$ of FIG. 4, if this were the location at which the next text character were desired.

Operation of the device to select Kanji characters is achieved by the organization of the central processor 10 and the disk store 11. Intermediate selection of Hiragana character defines a particular location in the intermediate language character font associated with that Hiragana character. However, the information located at this intermediate location is not a digitally encoded bit pattern for display on the CRT 12 in the text display area 13, but rather is the final address location of the intial address of a block of data storage locations in the disk store 11 corresponding to Kanji characters having the same oral sound as the selected Hiragana character. Thus, this block of Kanji characters is brought to the central processing unit 10, and, as previously indicated, one of these Kanji characters is selected and the encoded bit pattern associated therewith is stored at the next sequential text character location. Operation of mode selection is achieved by depression of the EOC button on the functional keyboard 16 indicating the end of the character. This is because it may require several Hiragana characters to define a block of Kanji characters for display in the character font display area 14 of the CRT 12 in the final selection. The EOC button indicates to the central processor 10 that no more intermediate address data is forthcomming, and the intermediate address data entered to that point defines the storage location in disk storage 11 of the Kanji characters from which final character selection must occur.

A similar character designation system is provided in conjunction with the alternative arrangement depicted in FIGS. 15 and 16. In this embodiment of the invention, a keyboard key selection system or type encoder 22 is employed in lieu of the light pen 17 of FIG. 1. Thus, to select the hiragana character corresponding to the Romaji syllable "no", one would merely depress the keyboard key of FIG. 16 labeled with the alphabetic character "K", along with the Hiragana character corresponding to the Romanji syllable "no". Depression of this key when operating with the ENGL button of the function keyboard depressed would result in appearance of the letter "K" in the next sequential text character location. However, operation of the embodiment of the invention with the HIRR button of the function keyboard depressed would result in the Hiragana character indicated on that same key appearing in the next sequential text character location.

It is to be understood, that with this embodiment of the invention, outline images of the keys in the keyboard would be displayed in the language character font display area 14, as depicted in FIG. 15. The symbols of the particular language characters in the character font from which text characters are to be selected would appear within the circles of FIG. 15 corresponding to the keyboard locations. By operation in this manner, when the device is to be operated in the Kanji mode, once intermediate character selection has occurred, the symbols appearing on the keyboard of FIG. 16 will no longer be the symbols appearing in the corresponding circles in FIG. 15. Instead, Kanji characters corresponding to the previously selected Hiragana or Katakana characters would appear in the circles corresponding to the keyboard keys. The operator would then determine form the language character font display area 14 which of the keys on the keyboard of FIG. 16 should be depressed. This selection would not bear any relationship to the inscriptions on the keyboard keys, but rather would depend entirely upon which of the Kanji characters in the language character font display 14 was to be selected, and within which of the images of the keys therein the chosen Kanji character appears. The corresponding key in FIG. 16 would then be depressed to reproduce an encoded bit pattern in the central processor 10 at the next sequential language character location.

The capability of the invention may be expanded further by displaying the Kanji characters within the circles of the keyboard image of FIG. 15 for only a predetermined period of time, after which these characters would be erased and replaced with other characters corresponding to the same intermediate Hiragana or Katakana character selected. Thus, the number of Kanji characters which could be displayed in response to an intermediate character selection would not be limited to the 45 character locations in the keyboard image of FIG. 15, but rather could be virtually any number, although all of the corresponding Kanji characters would not be displayed simultaneously. To enhance the ease of dealing with erased characters, the Kanji characters in the encircled key locations of FIG. 15 would not disappear simultaneously, but rather would be erased and replaced in a somewhat random pattern at different intervals. Thus the viewer could direct his attention to newly appearing symbols, rather than be confronted with a entirely new set of characters all at once.

The feature of expanded capability is also present in the embodiment reflected in FIGS. 3 and 4. In this embodiment, however, because of the greater number of language character font positions available, replacement of Kanji characters from which selection is to be made in rows $R_8$ through $R_{11}$ is made at one time. In the embodiment of the invention, 96 Kanji characters are stored in the disk store 11 in association with each Katakana or Hiragana character. Thus, in either the embodiment of FIG. 4 or in the embodiment of FIG. 15, not all of the Kanji characters associated with a particular Hiragana or Katakana character can be displayed simultaneously, so that some form of sequential viewing is normally necessary. The operator preferably controls the time at which the first portion of characters to be viewed should remain visible. Alternatively, programmed time intervals may be utilized and automatically controlled by the central processor 10, as with the embodiment of FIGS. 15 and 16.

Enumerable variations, modifications, improvements, and alterations in the disclosed invention will undoubtedly occur to those familar with language transposing devices. Accordingly, the present invention should not be limited to the specific embodiments depicted herein, but rather the invention is defined in the claims appended hereto.

I claim:

1. Apparatus for generating a text of information in a language form comprised of first and second sets of characters, wherein each character or group of characters of said first set bears a predetermined phonetic or semantic relationship to a character or group of characters of said second set, said apparatus comprising:

memory means for storing in a binary digital format each of the first and second sets of characters comprising said language form;

first selection means for selecting individual ones of said first set of characters for inclusion in the text of information being generated; display means including a first display area for displaying the text of information being generated and a second display aread for displaying predetermined ones of said second set of characters;

processing means coupled to said first selection means, to said memory means, and to said display means and including means responsive to the selection of each character of said first set by said first selection means for automatically accessing said selected character of said first set in binary digital format from said memory means, means for controlling said display means to display said accessed character of said first set in said first display area as part of said text of information, means responsive to the selection of each character or group of characters of said first set that bears said predetermined phonetic or semantic relationship to a character or group of characters of said second set for automatically accessing said character or group of characters of said second set in binary digital format from said memory means, and means for controlling said display means to display said accessed character or group of characters of said second set in said second display area;

second selection means for selecting a desired character or group of characters of said second set displayed in said second display area for substitution in said text of information in place of said selected character or group of characters of said first set that bears said predetermined phonetic or semantic relationship toward said selected character or group of characters of said second set; and said processing means is coupled to said second selection means and further includes means responsive to the selected character or group of characters of said second set for automatically substituting said selected character or group of characters of said second set for the selected character or group of characters of said first set by controlling said display means to display said selected character or group of characters of said second set in place of said selected character or group of characters of said first set in said text of information displayed in said first display area.

2. The apparatus of claim 1, wherein said predetermined phonetic or semantic relationship is sound similarity.

3. The apparatus of claim 2, wherein said first set of characters are phonetic characters and said second set of characters are ideographic characters.

4. The apparatus of claim 3, wherein said language form is Japanese and said phonetic characters include Hiragana characters and said ideographic characters include Kanji characters.

5. The apparatus of claim 3, wherein said language form is Japanese and said phonetic characters include Katakana characters and said ideographic characters include Kanji characters.

6. The apparatus of claim 3, wherein said language form is Japanese and said phonetic characters include Hiragana and Katakana characters and said ideographic characters include Kanji characters.

7. The apparatus of claim 2, wherein said language form comprises a third set of characters that are capable of being stored in a binary digital format in said memory means, said apparatus further comprising:

third selection means for selecting individual ones of said third set of characters for inclusion in the text of information to be generated; and said processing means is coupled to said third selection means and further includes means responsive to the selection of each character of said third set by said third selection means for automatically accessing said selected character of said third set in binary digital format from said memory means, and means for controlling said display means to display (for applying) said accessed character of said third set (to said display means in a format capable of being displayed by said display device) in said first display area as part of said text of information.

8. The apparatus of claim 7, wherein said language form is Japanese, said first set of characters include Hiragana and Katakana characters, said second set of characters include Kanji characters and said third set of characters include Romanji characters.

9. The apparatus of claim 1, wherein said first selection means comprises a plurality of operator-controlled keys, at least some of which are arranged in a predetermined matrix of columns and rows, and a first character set selection key that, when actuated, enables said at least some keys to individually select characters of said first set.

10. The apparatus of claim 9, wherein characters of said second set are displayed in said second display area in positions which are arranged in a matrix of columns and rows corresponding to said predetermined matrix.

11. The apparatus of claim 10, wherein said second selection means comprises a second character set selection key that, when actuated, enables said at least some keys to individually select those characters of said second set that are displayed in said second display area, whereby each displayed character of said second set is selected by depressing the key corresponding in position to the position of said character in the second display area.

12. The apparatus of claim 9, wherein said second selection means includes a light pen mechanism capable of being positioned adjacent a character of said second set to be selected for generating a signal indicative of the position of said selected characters in said second display area.

13. The apparatus of claim 9, wherein said second selection means includes a cursor display device capable of positioning a cursor in said second display area of said display means adjacent a character of said second set to be selected in order to generate a signal indicative of the position of said selected character in said second display area.

14. The apparatus of claim 1, wherein the first display area of said display means includes a predetermined dedicated area on the face of a cathode ray tube.

15. The apparatus of claim 1, wherein the second display area of said display means includes a predetermined dedicated area on the face of a cathode ray tube.

16. The apparatus of claim 1, wherein said display means includes a cathode ray tube having a first predetermined dedicated area on the face thereof defining said first display area, and a second predetermined dedicated area on the face thereof defining said second display area.

17. The apparatus of claim 1, wherein said memory means is capable of storing in binary digital format the selected characters of said first and second sets that comprise the text of information being generated.

18. The apparatus of claim 1, wherein said second selection means comprises an optical sensing chamber comprising a rectilinear array of photosensors adapted for receiving a juxtaposition relative thereto a laminar medium with a character of said second set displayed in contrast thereon, whereby said photosensors generate an encoded signal representative of said character in displayed in contrast thereon.

19. The apparatus of claim 17, further comprising an erase control means connected to said memory means for erasing the binary digital representation of the character stored therein corresponding to the last occupied character position in said text of information.

20. The apparatus of claim 1, further comprising means for printing the text of information generated and displayed by said display means in said first display area.

21. The apparatus of claim 1 or claim 4, wherein said first selection means includes a plurality of operator-controlled keys displaying an English-language alphanumeric character set thereon.

* * * * *